US012632454B1

(12) United States Patent
Goyal et al.

(10) Patent No.: US 12,632,454 B1
(45) Date of Patent: May 19, 2026

(54) WORKLOAD POOL MANAGEMENT WITH SEARCH TIME RANGE

(71) Applicant: Splunk LLC, San Francisco, CA (US)

(72) Inventors: Shalabh Goyal, Fremont, CA (US); Sailee Jain, Vancouver (CA); Hongxun Liu, Palo Alto, CA (US); Sirish Masur Mohan, Danville, CA (US); Karthikeyan Sabhanatarajan, San Francisco, CA (US)

( * ) Notice: Subject to any disclaimer, the term of this patent is extended or adjusted under 35 U.S.C. 154(b) by 0 days.

(21) Appl. No.: 18/141,321

(22) Filed: Apr. 28, 2023

(51) Int. Cl.
G06F 16/2453 (2019.01)
G06F 16/2455 (2019.01)

(52) U.S. Cl.
CPC .. G06F 16/24549 (2019.01); G06F 16/24542 (2019.01); G06F 16/2455 (2019.01)

(58) Field of Classification Search
None
See application file for complete search history.

(56) References Cited

U.S. PATENT DOCUMENTS

| | | | | |
|---|---|---|---|---|
| 7,693,847 | B1 * | 4/2010 | Brown | G06F 9/5038 707/694 |
| 7,937,344 | B2 | 5/2011 | Baum et al. | |
| 7,941,804 | B1 * | 5/2011 | Herington | G06F 9/5083 718/104 |
| 8,112,425 | B2 | 2/2012 | Baum et al. | |
| 8,156,502 | B1 | 4/2012 | Blanding | |

| | | | | |
|---|---|---|---|---|
| 8,412,696 | B2 | 4/2013 | Zhang et al. | |
| 8,589,375 | B2 | 11/2013 | Zhang et al. | |
| 8,589,403 | B2 | 11/2013 | Marquardt et al. | |
| 8,589,432 | B2 | 11/2013 | Zhang et al. | |
| 8,682,925 | B1 | 3/2014 | Marquardt et al. | |
| 8,738,587 | B1 | 5/2014 | Bitincka et al. | |
| 8,738,629 | B1 | 5/2014 | Bitincka et al. | |
| 8,751,529 | B2 | 6/2014 | Zhang et al. | |
| 8,788,525 | B2 | 7/2014 | Neels et al. | |
| 8,788,526 | B2 | 7/2014 | Neels et al. | |
| 8,826,434 | B2 | 9/2014 | Merza | |
| 8,983,994 | B2 | 3/2015 | Neels et al. | |
| 9,208,240 | B1 | 12/2015 | Anton et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 10,942,774 | B1 * | 3/2021 | Aleti | G06F 16/24549 |
| 12,204,939 | B1 * | 1/2025 | Brown | G06F 9/4887 |
| 2005/0149908 | A1 | 7/2005 | Klianev | |

(Continued)

OTHER PUBLICATIONS

Splunk Enterprise 8.0.0 Overview, available online, retrieved May 20, 2020 from docs.splunk.com (17 pages).

(Continued)

*Primary Examiner* — Neveen Abel Jalil
*Assistant Examiner* — John J Morris
(74) *Attorney, Agent, or Firm* — Polsinelli P.C.

(57) ABSTRACT

Workload pool management with search time range includes calculating a search time range for a query, relating metadata including the search time range for the query, and comparing predicates in workload rules to the metadata for the query to identify a matching workload rule. Comparing the predicates includes the search time range to search time criteria in the predicates. The query is processed by the workload pools according to the matching workload rule.

15 Claims, 16 Drawing Sheets

(56) References Cited

U.S. PATENT DOCUMENTS

| | | | |
|---|---|---|---|
| 2007/0299836 A1* | 12/2007 | Hou | G06F 16/2452 |
| 2008/0271039 A1 | 10/2008 | Rolia et al. | |
| 2011/0288847 A1 | 11/2011 | Narayanan et al. | |
| 2012/0054175 A1* | 3/2012 | Barsness | G06F 16/2455 |
| | | | 707/719 |
| 2013/0326620 A1 | 12/2013 | Merza et al. | |
| 2014/0007121 A1* | 1/2014 | Caufield | G06F 9/4843 |
| | | | 718/103 |
| 2014/0068550 A1 | 3/2014 | Simitsis et al. | |
| 2014/0214888 A1 | 7/2014 | Marquardt et al. | |
| 2014/0236889 A1 | 8/2014 | Vasan et al. | |
| 2014/0236890 A1 | 8/2014 | Vasan et al. | |
| 2014/0324862 A1 | 10/2014 | Bingham et al. | |
| 2014/0330815 A1 | 11/2014 | Bitincka et al. | |
| 2014/0344256 A1 | 11/2014 | Bitincka et al. | |
| 2015/0019537 A1 | 1/2015 | Neels et al. | |
| 2015/0033332 A1 | 1/2015 | Merza | |
| 2015/0033333 A1 | 1/2015 | Merza | |
| 2015/0113540 A1 | 4/2015 | Rabinovici et al. | |
| 2015/0142847 A1 | 5/2015 | Neels et al. | |
| 2015/0339344 A1 | 11/2015 | Neels et al. | |
| 2016/0004750 A1 | 1/2016 | Marquardt et al. | |
| 2016/0036850 A1 | 2/2016 | Merza | |
| 2016/0036851 A1 | 2/2016 | Merza | |
| 2016/0088125 A1 | 3/2016 | Polychronis | |
| 2017/0220281 A1 | 8/2017 | Gupta et al. | |
| 2017/0220389 A1 | 8/2017 | Michael et al. | |
| 2019/0098106 A1 | 3/2019 | Mungel et al. | |
| 2019/0230155 A1 | 7/2019 | Chin et al. | |
| 2020/0034177 A1 | 1/2020 | Geldart et al. | |
| 2020/0050586 A1* | 2/2020 | Pal | G06F 16/148 |
| 2021/0004675 A1* | 1/2021 | Ramesh | G06N 3/08 |
| 2022/0164227 A1* | 5/2022 | Tiwary | G06F 18/23 |
| 2023/0342195 A1* | 10/2023 | Ferstl | G06F 9/5027 |
| 2024/0220495 A1* | 7/2024 | Trigonakis | G06F 16/24535 |

OTHER PUBLICATIONS

Splunk Cloud 8.0.2004 User Manual, available online, retrieved May 20, 2020 from docs.splunk.com (66 pages).

Splunk Quick Reference Guide, updated 2019, available online at https://www.splunk.com/pdfs/solution-guides/splunk-quick-reference-guide.pdf, retrieved May 20, 2020 (6 pages).

Carasso, David, "Exploring Splunk" published by CITO Research, New York, NY, Apr. 2012 (156 pages).

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010 (9 pages).

Office Action in related U.S. Appl. No. 16/147,262 mailed Jun. 26, 2020 (7 pages).

Office Action in related U.S. Appl. No. 16/147,251 mailed Jun. 25, 2020 (33 pages).

Redhat, "Red Hat Enterprise Linux 6", Resource Management Guide, Edition 6, Oct. 20, 2017 (69 pages).

Vaid, K., "QPS,KW-hr,MTBF,DT,PUE,IOPS,DB/RH: A Day in the Life of a Datacenter Architect", Workshop on Managing Systems via Log Analysis and Machine Learning Techniques (SLAML '10) Vancouver, BC, Canada, Oct. 3, 2010 (7 pages).

Barroso et al., "The Google Cluster Architecture", IEEE Computer Society, 2013, pp. 22-28 (7 pages).

O'Gorman et al., "Multiple Query Optimization by Cache-Aware Middleware Using Query Teamwork", Proceedings 18th International Conference on Data Engineering, Feb. 26, 2002, Mar. 1, 2002 (1 page).

Zhang et al., "Workload Management in Database Systems: A Taxonomy", IEEE Transactions on Knowledge and Data Engineering, vol. 30, Issue 7, Jul. 1, 2018, pp. 1386-1402 (24 pages).

Splunk Inc., "Dynamic Reassignment of Search Processes into Workload Pools in a Search and Indexing System", U.S. Appl. No. 16/147,262, including its prosecution history; filed Sep. 28, 2018 (354 pages).

Splunk Inc., "Achieve Search and Ingest Isolation via Resource Management in a Search and Indexing System", U.S. Appl. No. 16/147,251, including its prosecution history; filed Sep. 28, 2018 (605 pages).

* cited by examiner

Workload
Rules
200

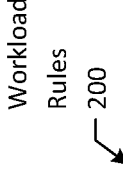

Admission Control Rule 202

Predicate 208

Search Time Range Criteria 210

Other Criteria 212

Schedule 216

Actions 220

Output Message 218

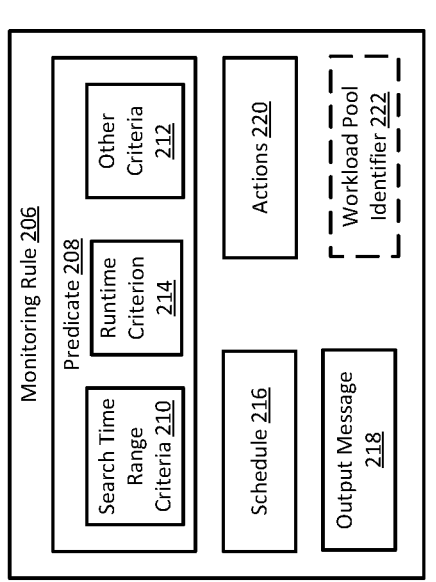

Monitoring Rule 206

Predicate 208

Search Time Range Criteria 210

Runtime Criterion 214

Other Criteria 212

Schedule 216

Actions 220

Output Message 218

Workload Pool Identifier 222

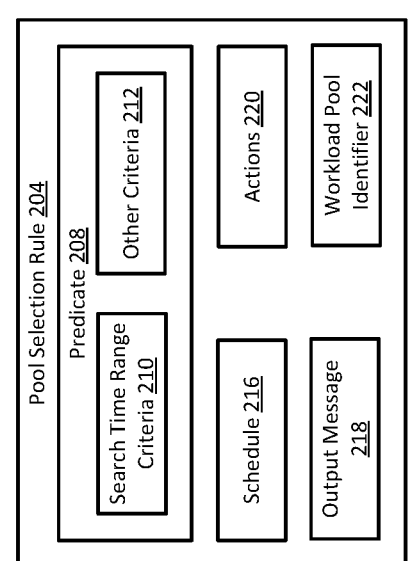

Pool Selection Rule 204

Predicate 208

Search Time Range Criteria 210

Other Criteria 212

Schedule 216

Actions 220

Output Message 218

Workload Pool Identifier 222

Obtain a query
602

Calculate search time range for query
604

Relate metadata having search time range to query
606

Evaluate metadata against predicates of workload rules to identify matching workload rule
610

Process query by workload pools based on workload rule
612

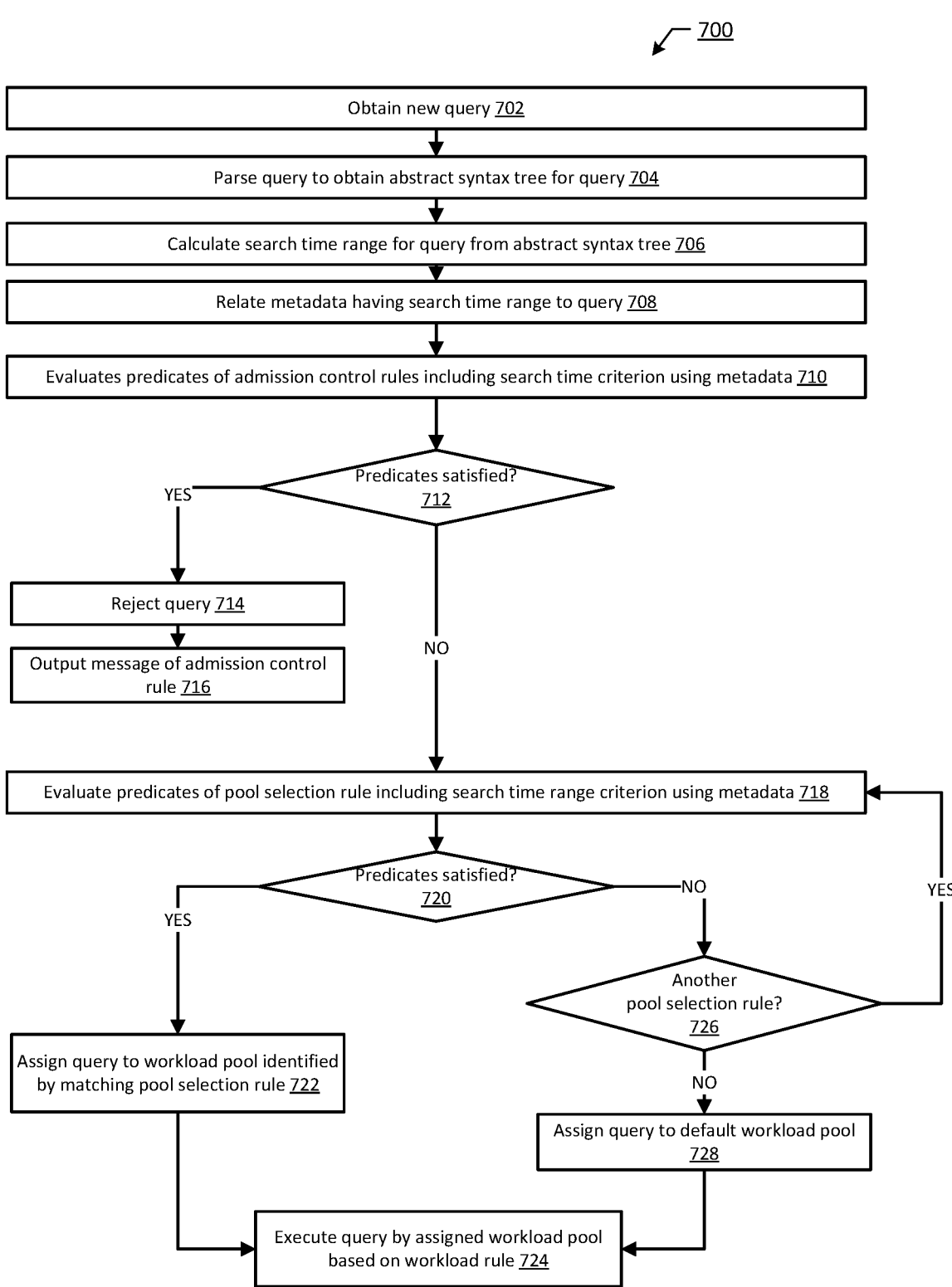

700

Obtain new query 702

Parse query to obtain abstract syntax tree for query 704

Calculate search time range for query from abstract syntax tree 706

Relate metadata having search time range to query 708

Evaluates predicates of admission control rules including search time criterion using metadata 710

Predicates satisfied?
712

YES

Reject query 714

Output message of admission control rule 716

NO

Evaluate predicates of pool selection rule including search time range criterion using metadata 718

Predicates satisfied?
720

YES

NO

YES

Another pool selection rule?
726

Assign query to workload pool identified by matching pool selection rule 722

NO

Assign query to default workload pool 728

Execute query by assigned workload pool based on workload rule 724

FIG. 7

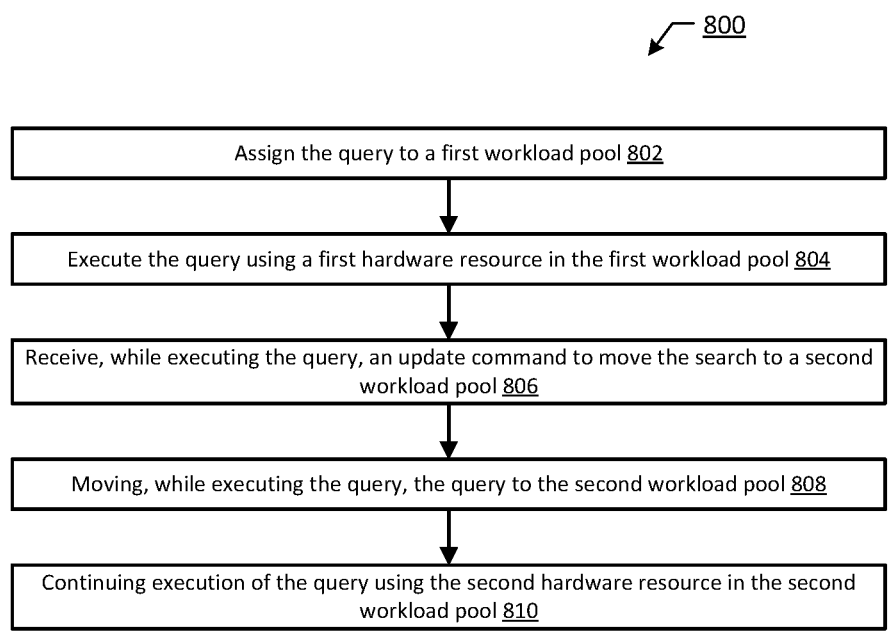

800

Assign the query to a first workload pool 802

Execute the query using a first hardware resource in the first workload pool 804

Receive, while executing the query, an update command to move the search to a second workload pool 806

Moving, while executing the query, the query to the second workload pool 808

Continuing execution of the query using the second hardware resource in the second workload pool 810

Execute query on assigned workload pool 1002

Does query have subquery? 1004

NO → END

YES

Recursively process subquery to assign workload pool for subquery and process subquery 1006

WORKLOAD POOL MANAGEMENT WITH SEARCH TIME RANGE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Resource management is sharing of resources amongst multiple consumers of the resources. For computer processes, resource management is the sharing of hardware resources. For many applications, resource management is not considered at the application level. In particular, resource management is often delegated to the operating system to manage and is invisible to the application tier. For example, the operating system might give more compute cycles to user level applications and fewer compute cycles to background tasks.

BRIEF DESCRIPTION OF THE DRAWINGS

Illustrative examples are described in detail below with reference to the following figures:

FIG. 2 illustrates a block diagrams of workload rules in accordance with the disclosed embodiments.

FIG. 7 is a flow diagram for processing a query using an admission control rule and a pool selection rule in accordance with disclosed embodiments.

FIG. 8 is a flow diagram for moving a query to a different workload pool in accordance with disclosed embodiments.

DETAILED DESCRIPTION

In general, embodiments are directed to resource management in a data intake and query system. Specifically, in a data intake and query system, events are received, indexed, and stored in a data store. Events are associated with a timestamp when stored in the data intake and query system. Events may be received and organized in storage according to the timestamps associated with the events. For example, events may be received in approximately timestamp order. Further, events that have the same ranges of timestamps may be stored together. Concurrently, with the storage of data, search queries (i.e., queries) may be received and processed. Generally, queries specify a latest time and an earliest time for matching events. Because events are organized in storage according to the timestamps, the latest and earliest times limit the portions of the storage that are searched.

Some queries are more critical than others. For example, a user learning how to send queries to the data intake and query system may unintentionally cause critical queries to slow. Additionally, the processing of a query may have unpredictability in terms of the number of hardware resources involved. For example, the number of data stores having data matching the search query may be unknown until the indexers start processing the search query.

One or more embodiments provide explicit control for resource allocation using search time range of queries. As used herein, the term search time range refers to the difference between the latest time and the earliest time identified in a query. In one or more embodiments, the explicit control is through a partitioning of resources into workload pools, whereby workload rules dictate the assignment of requests to the data intake and query system to the workload pools. One or more embodiments support having the predicates of the workload rules including search time range criterion. Thus, one or more embodiments provide for more granular control over the assignment of searches to workload pools.

Figure 1:
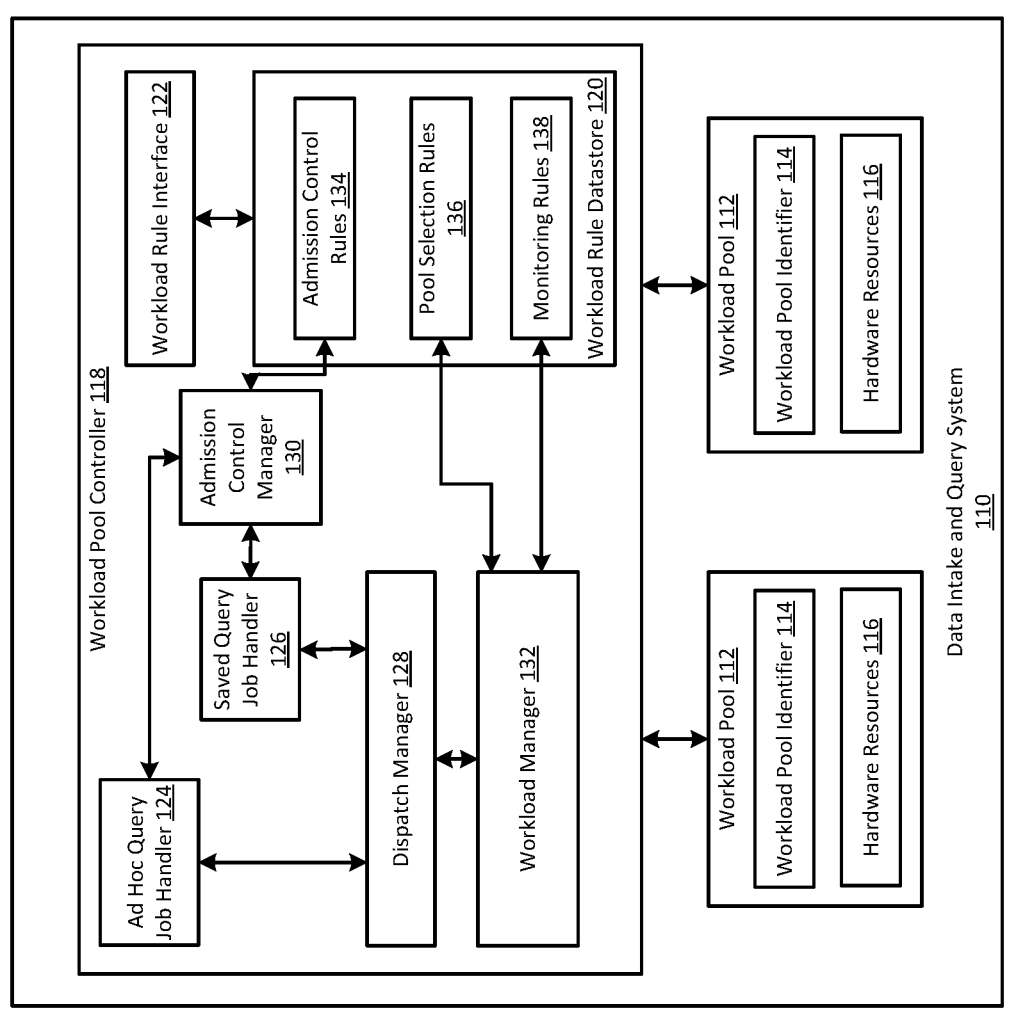
FIG. 1 illustrates a block diagram of an example data intake and query system in accordance with the disclosed embodiments.

Turning to the Figures, FIG. 1 illustrates a block diagram of an example data intake and query system 110 in accordance with the disclosed embodiments. The data intake and query system 110 in FIG. 1 corresponds to the data intake and query system described below and in FIGS. 13-16. Briefly, the data intake and query system 110 includes functionality to store events. An event is a discrete portion of machine data that is associated with a timestamp. The events are transmitted by forwarders to indexers where the events are indexed and then stored on one or more storage systems. Once stored, events may be queried in order to perform data analytics.

A query is a request to search for data matching parameters of a query, whereby the query may also include commands for pre or post processing of the data. The data intake and query system 110 is configured to process ad hoc queries and saved queries. Ad hoc queries are queries that are transmitted to and processed by the data intake and query system 110 on demand. Saved queries are queries that are for processing at one or more future times.

To process queries, the data intake and query system 110 performs resource management using workload pools 112. A workload pool 112 is a construct that relates a set of hardware resources to one or more workload rules. The one or more workload rules causes one or more queries to be assigned to a workload pool 112. In one or more embodiments, the workload pool is a user application level abstraction and supports processes to an operating system level resource management layer.

As shown in FIG. 1, a workload pool 112 includes a workload pool identifier 114 and a set of hardware resources 116. The workload pool identifier 114 is a unique identifier of the workload pool 112. For example, the workload pool identifier 114 may be an alphanumeric identifier of the workload pool 112. The workload pool identifier 114 may be assigned by a user, such as a network administrator, or by the computing system. In one or more embodiments, more than one workload pool identifier 114 may be assigned to the same workload pool 114, whereby each workload pool identifier 114 assigned to the workload pool uniquely identifies the workload pool 112. For example, a first workload pool identifier may be a user level identifier, while a second workload pool identifier is an operating system level identifier. For example, the first workload pool identifier may be used for communication between a user and the data intake and query system 110 while the second identifier may be used for communication between the data intake and query system 110 and one or more operating systems.

In one or more embodiments, the hardware resources of the data intake and query system 110 are partitioned into workload pools. A partition is a set of hardware resources 116. Thus, a set of hardware resources 116 is the hardware resources that are assigned to the workload pool 112. A hardware resource may be assigned to a single workload pool at a single time. Unused hardware resources in a workload pool may be used by other workload pools, and then reverted back to the assigned workload pool.

In one or more embodiments, a hardware resource is at least a partition of an underlying hardware device. For example, a hardware resource 116 may be an execution time using the hardware device, or a portion or a share of the hardware device assigned to the workload pool 112. For example, if the hardware device is a central processing unit (CPU), the hardware resource may be CPU cycles, a number of cores of the CPU, etc. Further, more than one hardware device may be part of a hardware resource. For example, a hardware resource may be a portion of a number of queues. Example hardware resources include input output resources, processing resources, storage resources, memory resources, threads, and other types of resources on the computer. Hardware resources can be used to achieve isolation, prevent over-use as well as prioritization for processes assigned to workload pools.

The hardware resources 116 may be assigned to the workload pool 112 as percentages of the hardware device. By using percentages, the same workload pool definition may be used across multiple computing systems without adjusting for the different amounts of resources on each computing system.

Disjoint sets of workload pools may exist for search query requests and for data ingest requests. The set of query workload pools and the set of ingest workload pools are disjoint in that a workload pool does not exist that is in both sets. In other words, a workload pool is either in the set of query workload pools or in the set of ingest workload pools, but not both. By having the separation, data ingest requests may have different priorities than search queries. Further, a large number of search queries does not cause starvation of the data ingest requests. For security applications that rely on events being received, stored, and processed in real time, the isolation between the processing of search query requests and data ingest requests means that the amount of resource allocation can be maintained to achieve the real time requirements. Further, the isolation may help to prevent data loss through dropped packets being received and may save network bandwidth.

Continuing with FIG. 1, the workload pools 112 are connected to a workload pool controller 118. The workload pool controller 118 controls the assignment of the queries to the workload pools. Queries that are assigned to the same workload pool share the hardware resources 116 allocated to the workload pool while queries assigned to different workload pools do not share hardware resources 116.

The workload pool controller 118 includes a workload rule datastore 120. The workload rule datastore 120 is any type of storage unit and/or device (e.g., a file system, database, data structure, or any other storage mechanism) for storing workload rules. In general, a workload rule relates a set of one or more criterion to an action for processing the query. If a pending request satisfies the set of one or more criterion of the rule, then the action in the corresponding workload rule is performed.

Multiple types of workload rules exist. The types of workload rules include admission control rules 134, pool selection rules 136, and monitoring rules 138. Admission control rules 134 define whether to admit the query for processing using the set of one or more criterion. In one or more embodiments, admission control rules 134 may be filtering rules that filter out requests or accept rules that define when to accept requests. Pool selection rules 136 define an assignment of a query to a workload pool based using the set of one or more criterion. Each pool selection rule 136 may be related to a single workload pool 112 in accordance with one or more embodiments and defines whether the related workload pool should be used for a pending query. Monitoring rules 138 when and how to monitor the execution of queries on the workload pool. Specifically, monitoring rules 138 define which queries to monitor the execution, how to modify the execution, and the actions to perform based on the monitoring.

The workload rule datastore 120 is connected to a workload rule interface 122. The workload rule interface is an application programming interface or graphical user interface that includes functionality to receive a specification of the workload rule. For example, the workload rule interface may be a graphical user interface. Examples of the workload rule interface are presented in FIGS. 3-5.

Continuing with FIG. 1, the workload pool controller 118 further includes an ad hoc query handler 124 and a scheduler 126. The ad hoc query handler 124 is configured to receive ad hoc queries. In one or more embodiments, the ad hoc query handler 124 is a RESTful state architecture (REST) application programming interface (API) handler. The ad hoc query handler 124 interfaces with the client issuing the request having the query, provides updated status information, and response messages.

The scheduler 126 is a job handler for saved queries that triggers the execution of the saved query at predefined times. For example, the saved query may be a query received by the data intake and query system with a defined time or interval for execution. The scheduler 126 is configured to trigger the execution of the query at the defined time.

The ad hoc query job handler 124 and the scheduler 126 may further include functionality to block or otherwise filter searches. To perform the filtering, the ad hoc query job handler 124 and the scheduler 126 includes functionality to interface with an admission control manager 130. The admission control manager 130 is a software process. The admission control manager 130 includes functionality to evaluate the query using the admission control rules 134 to determine whether any of the admission control rules are satisfied.

The ad hoc query job handler 124 and the scheduler 126 are also connected to the dispatch manager 128. The dispatch manager 128 is configured to dispatch a query to a workload pool for execution. The dispatch manager 128 may parse the query and add metadata to the query prior to dispatching. The dispatch manager 128 is then configured to dispatch the query to execute by the selected workload pool.

Dispatching the query includes interfacing with the workload manager 132 to select a workload pool and perform monitoring using the monitoring rules. The workload manager 132 is configured to evaluate the query using the pool selection rules to select a workload pool 112 from the set of workload pools to process the query. The workload manager 132 is further configured to respond to the dispatch manager 128 with the selected workload pool. The workload manager 132 is further configured to monitor the execution using the monitoring rules 138. Specifically, the workload manager 132 includes functionality to evaluate the query using the monitoring rules to identify which, if any, monitoring rules apply to the query. The monitoring may be performed periodically. The workload manager 132 further includes functionality to perform the monitoring according to the matching monitoring rule.

FIG. 2 illustrates block diagrams of workload rules 200 in accordance with the disclosed embodiments. Specifically, FIG. 2 shows block diagrams of the different types of workload rules 200 in accordance with one or more embodiments. As discussed above, the different types of workload rules 200 include an admission control rule 202, pool selection rule 204, and monitoring rule 206. Each of the respective types of rules include a predicate 208. The predicate 208 is the set of criteria that defines whether the workload rule is applicable to the query. A predicate 208 is a function that takes a set of arguments as input and returns a Boolean. The predicate 208 may include multiple criteria for the workload pool. The set of criteria may include search time criteria 210 and other criteria 212. The search time criteria is a criteria on the range of time in the timestamps associated with possible matching events. Namely, the search time criteria is the difference between the earliest timestamp of an event that could satisfy the query and the latest timestamp of an event matching the query. In one or more embodiments, the search time criteria 210 in the predicate may be specified as an upper and/or lower bounds on the search time range. By way of some specific examples, the predicate may specify the search time criteria as any of the following: less than a month, more than a month and less than a year, less than a day, three to four hours, more than two years, etc.

Notably, at the time in which the predicate 208 is evaluated with the query, the query is not yet processed to search the datastore for matching events. Thus, the search time criteria is a criteria on the parameters expressly or inherently specified in the query. Express search time ranges are explicitly specified in the query, such as by identifying a starting and ending timestamps. Different user interface techniques may be used to explicitly specify a search time range. For example, the search time ranges may be specified through query parameters or within the search query string. By way of a more specific example, a time picker or an earliest or latest time for time modifiers may be used. If multiple techniques are used in a single query, one technique is determined to take precedence. For example, time modifiers in the query may have higher precedence than in the parameters. In a saved search, the dispatch search parameters may explicitly provide the search time ranges.

Implied time ranges are time ranges that are defined by default. By way of some examples, the data intake and query system may specify that if a time range is undefined, then the previous month, previous day, or all time is used.

In one or more embodiments, while being distinct from the runtime of the query, the search time criteria is a proxy for the runtime. Because events are stored in the data intake and query system according to timestamps, the longer the search time range that is specified in the query, the number of events the query has to process may be greater, which may cause the runtime to take longer to process the query. By supporting search time criteria in the predicate, embodiments allow for preselecting workload pools according to an estimated length of time to process the query. In some cases in which bursts of events are received and indexed, using the search time range may be an imperfect proxy. For example, if more events are received for a single day than for an entire month, then searching the day's events may take longer than searching the month's events.

Continuing with the predicate 208, the other criteria may be user identifier, software application, role of the user, type of request (e.g., search or ingest), source type (e.g., for ingest requests), or other aspects of requests and a value for those arguments. Thus, the other criteria includes criteria on additional parameters of the query that dictate whether the corresponding workload rule applies. Criteria in the predicate may be combined by "and" or "or" statements. The output of the predicate is a Boolean dictating whether the corresponding workload rule applies. In one or more embodiments, if the Boolean output of the predicate is true, then the corresponding workload rule applies.

In one or more embodiments, in the monitoring rule 206, the predicate 208 may further include a runtime criterion 214. The runtime criterion 214 is a criterion on the length of time to execute the query. In one or more embodiments, the length of time is an actual length of time and the runtime criterion 214 includes a lower bound. Namely, in embodiments in which the predicate of the monitoring rule 206 includes the runtime criterion 214, the predicate of the monitoring rule 206 is evaluated while the query is executing. Thus, the monitoring rule 206 is satisfied when the runtime of the query first satisfies the lower bounds of the runtime criterion 214.

Although not shown in FIG. 2, in other embodiments, the runtime criterion may be separate from the predicate. For example, the runtime criterion may be a monitoring parameter, whereby if the query satisfies the predicate (e.g., prior to execution of the query), the data intake and query system then continually monitors the execution using the monitoring parameter. In such embodiments, the data intake and query system determines which monitoring rules apply and then compares the runtime to the runtime criterion in the monitoring rules.

Continuing with FIG. 2, the workload rules 200 may further include a schedule 216, output message 218, and one or more actions 220. The schedule 216 defines the time period by which the workload rule applies to evaluate the predicate 208. The schedule is based on a current time when the workload rule is being evaluated. For example, the schedule may be based on the time when the query enters the data intake and query system or when the query is set to execute. For example, the schedule may be used to apply certain workload rules only during high peak execution periods. The schedule determines the time period during which the workload rule is valid. If the schedule is set to Always On (the default), the workload rule remains valid indefinitely and does not expire. If the schedule is set to Time Range, the workload rule is valid during the specified time range only and expires when the time range ends. If the schedule is set to Every Day, Every Week, or Every Month, the workload rule becomes valid on a recurring basis during the specified time range every day, on the specified days of the week, or on the specified days of the month. The schedule time for a workload rule is based on the system timezone, regardless of the timezone set for an individual user in the UI.

The output message 218 is an optional user defined message that is generated when the workload rule applies. For example, the output message 218 may be an error message detailing an error with the query. The output message may be a message informing the requesting system of the action that is performed responsive to the predicate evaluating to true.

The one or more actions 220 is a specification of the operations to perform when the workload pool applies. For the admission control rule 202, the one or more actions may be to filter or delay execution of the query. In some embodiments, the action for the admission control rule 202 may be to request a revision from the user of the query. In some embodiments, the action for the admission control rule 202 may be to delay execution of the query.

The one or more actions 220 of a pool selection rule 204 may be to put the query in the workload pool identified by the workload pool identifier 222. The workload pool identifier 222 matches the workload pool identifier discussed above with reference to FIG. 1 to uniquely identify the workload pool. Similar to the pool selection rule 204, the one or more actions 220 of a monitoring rule 206 may be to move the query to a different workload pool, such as the workload pool identified by the workload pool identifier 222. As another example, the one or more actions 220 of the monitoring rule 206 may be to halt or abort execution of the query, delay execution of the query to a time in which the system is less busy, move the query to another pool (e.g., to a workload pool to with more resources to execute faster, to a workload pool with fewer resources to not take as much of the computing resources), and output the output message.

Figure 3:
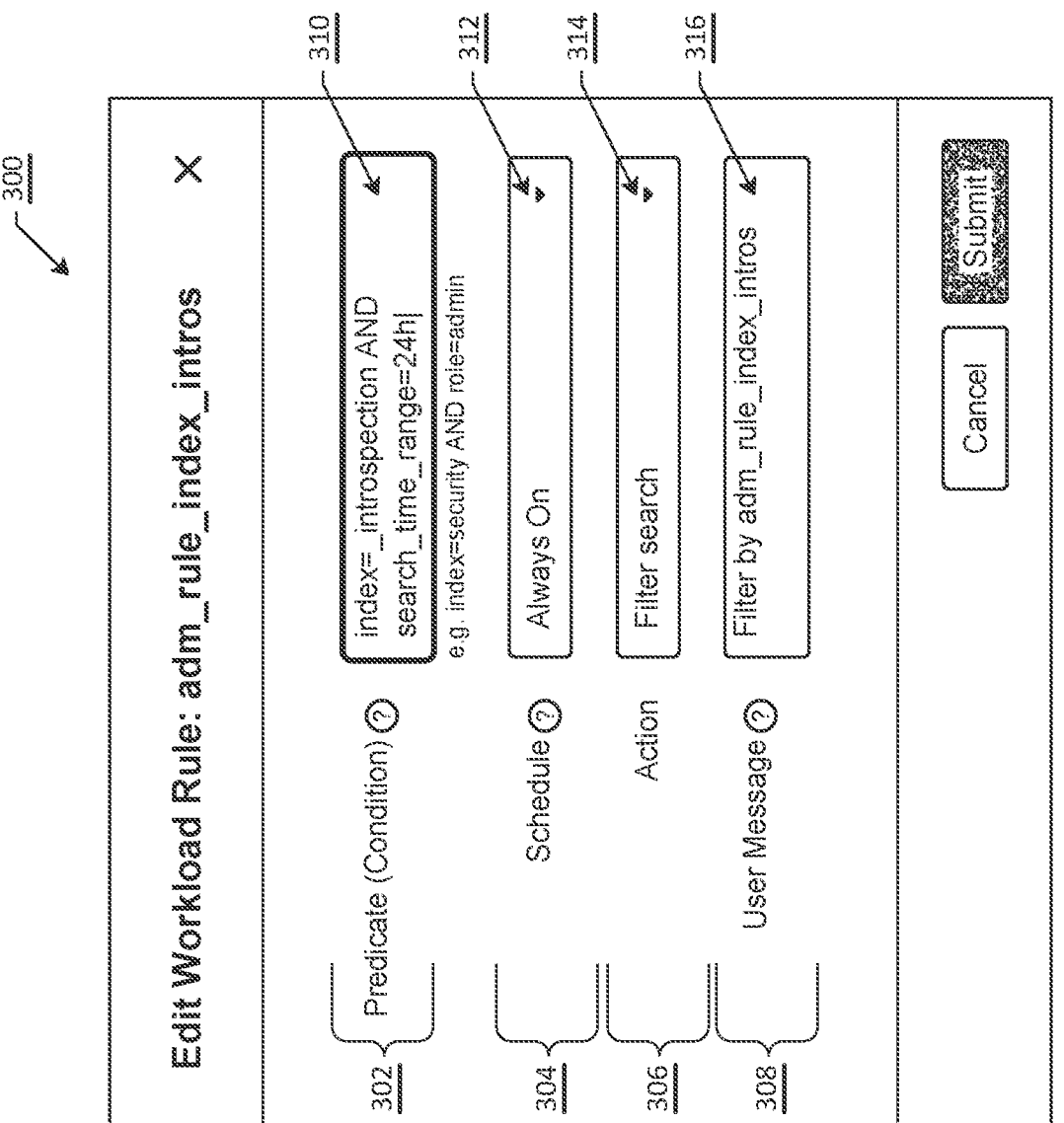
FIG. 3 illustrates an example user interface for submitting an admission control rule in accordance with disclosed embodiments.
Figure 4:
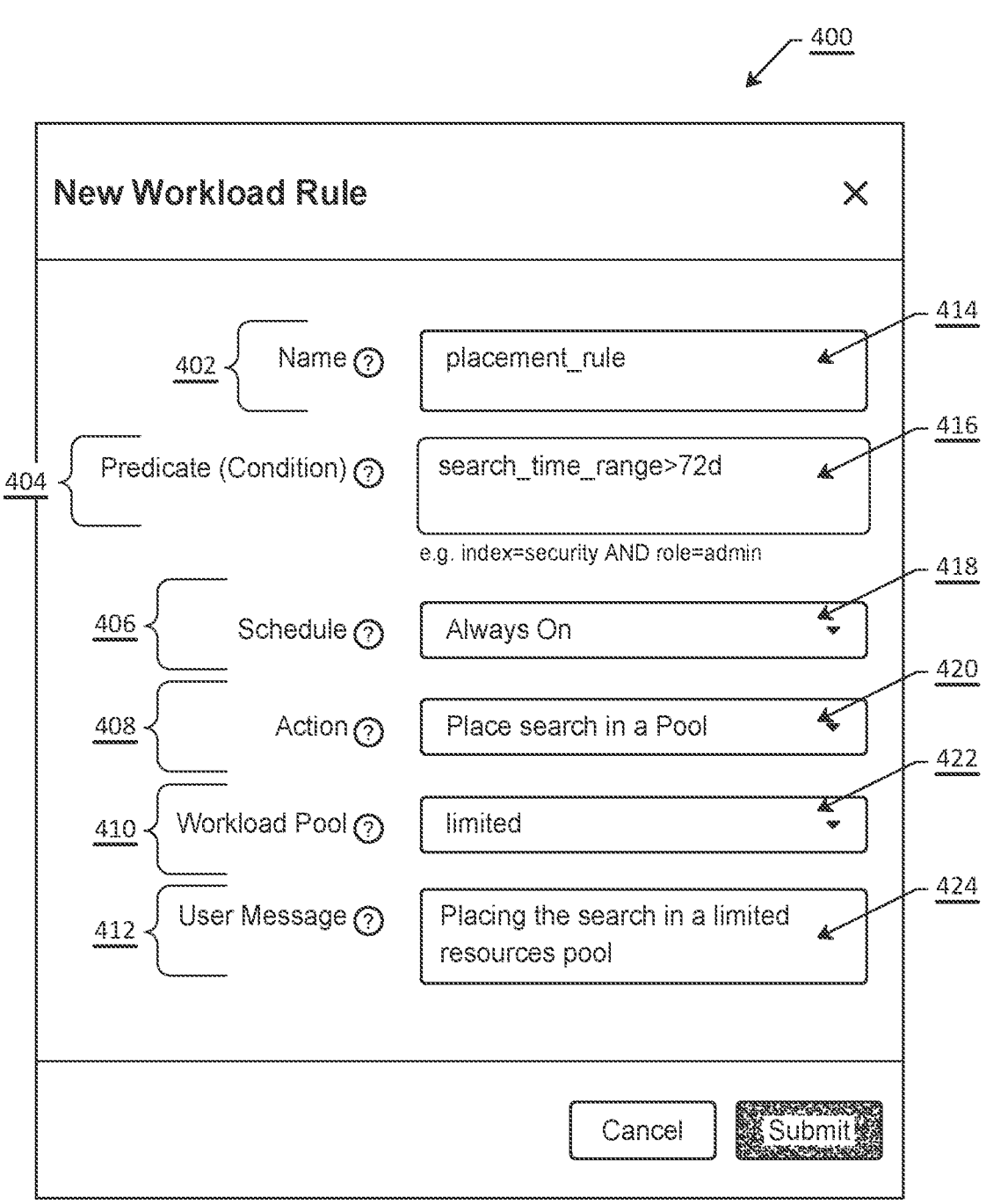
FIG. 4 illustrates an example user interface for submitting a pool selection rule in accordance with disclosed embodiments.
Figure 5:
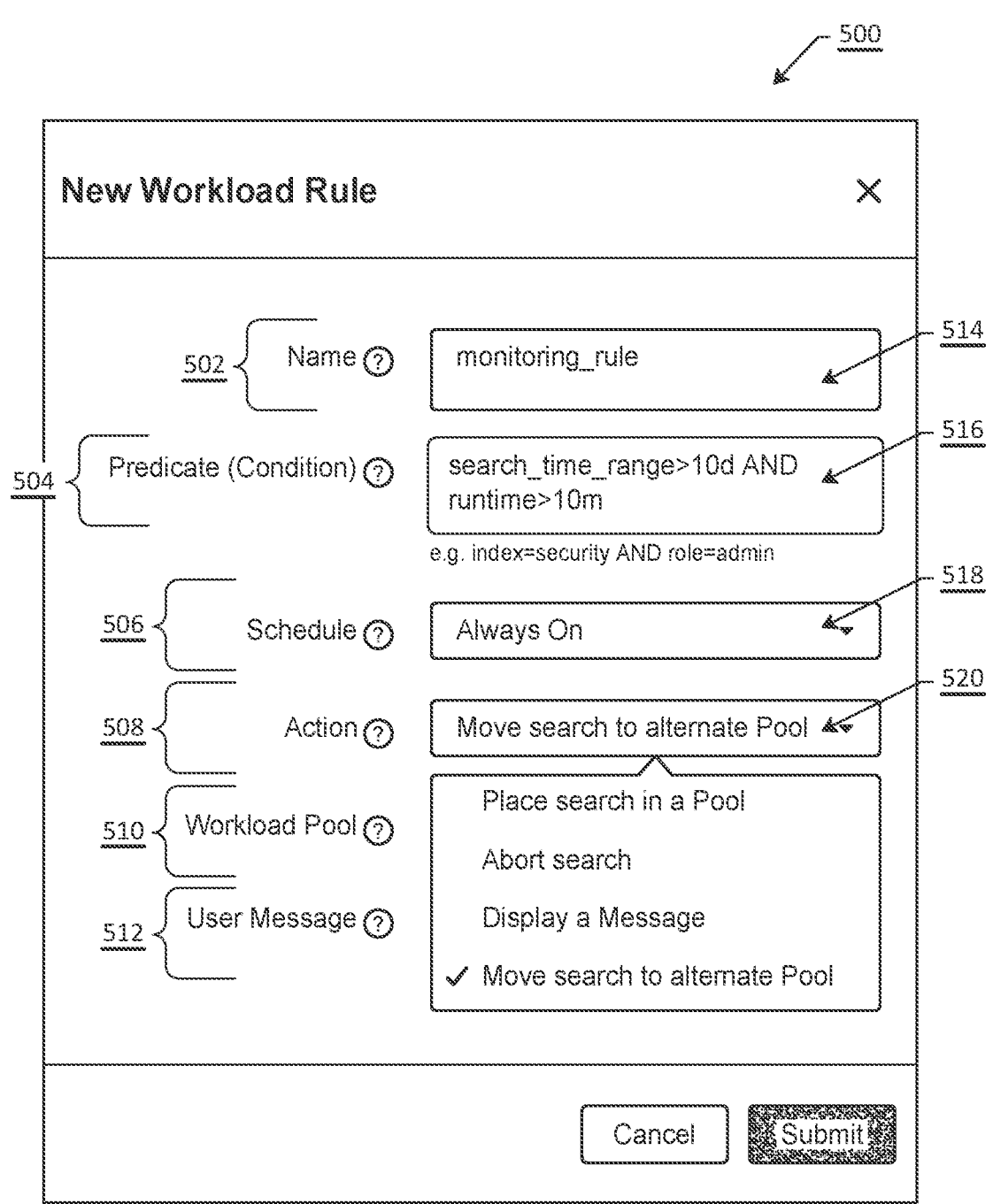
FIG. 5 illustrates an example user interface for submitting a monitoring rule in accordance with disclosed embodiments.

Different techniques may be used to specify the workload rules. FIGS. 3-5 show example user interfaces for a user to submit a workload rule. FIG. 3 illustrates an example user interface 300 for submitting an admission control rule in accordance with disclosed embodiments. As shown in FIG. 3, the user interface 300 for the admission control rule includes sections for the user to submit the predicate 302, the schedule 304, the action 306, and the user message 308. The user message is the output message that is outputted when the corresponding workload rule is matched to a query. For the predicate 302, the user interface supports the insertion of a function (e.g., "index=_introspection AND search_time_range=24 h") into the text box 310. As shown, the predicate evaluates to a Boolean and applies the admission control rule when the search time range is 24 hours (h). Thus, if a query is submitted that has an earliest time for a timestamp and a latest time for the timestamp 24 hours apart, regardless of which 24 hours, the admission control rule applies when the index being searched is also labeled_introspection.

As indicated in the schedule 304, the user may select from various possible schedules using drop down box 312. In the example, the user selects that the admission control rule 300 is always on. In the action 306 section, the user may select from various possible actions using drop down box 314. In the example, the user selects that matching queries are filtered by the admission control rule 300. The user message 308 section allows the user to specify a user defined message (e.g., "filter by admin_rule_index_intros"). Thus, the end user that submits the query is provided with a reason for the query not to be executed.

FIG. 4 illustrates an example user interface for submitting a pool selection rule 400 in accordance with disclosed embodiments. As shown in FIG. 4, the user interface 400 for the pool selection rule includes sections for the user to submit a user defined name 402, the predicate 404, the schedule 406, the action 408, a workload pool identifier 410, and the user message 412. In the name text box 414 of the name section 402, the user may provide a user defined name for later reference. For the predicate 404, the user interface supports the insertion of a function (e.g., "search_time_range=72 d") into the text box 416. As shown, the predicate evaluates to a Boolean and applies the pool selection rule when the search time range is 72 days (d) in the example. Thus, if a query is submitted that has an earliest time for a timestamp and a latest time for the timestamp 72 days apart, regardless of which 72 days, the pool selection rule applies.

As indicated in the schedule 406, the user may select from various possible schedules using drop down box 418 similar to the admission control rule in FIG. 3. In the example, the user selects that the pool selection rule 400 is always on. In the action 408 section, the user may select from various possible actions using drop down box 420. In the example, the user selects that matching queries are placed in a particular pool. The pool identifier 410 section includes a drop down box 420 for the user to select the workload pool identifier. In the example, the user selects the workload pool having the workload pool identifier of "limited." For example, the limited workload pool may exist because it is allocated limited hardware resources. Thus, the end user's query to search 72 days of data does not affect the operations of other queries. The user message 412 section allows the user to specify a user defined message (e.g., "Placing the search in a limited resources pool"). Thus, the end user that submits the query is provided with a reason for the delay in receiving results of executing the query.

FIG. 5 illustrates an example user interface for submitting a monitoring rule in accordance with disclosed embodiments. FIG. 5 illustrates an example user interface for submitting a monitoring rule 500 in accordance with disclosed embodiments. As shown in FIG. 5, the user interface 500 for the monitoring rule includes sections for the user to submit a user defined name 502, the predicate 504, the schedule 506, the action 508, a workload pool identifier 510, and the user message 512. In the name text box 514 of the name section 502, the user may provide a user defined name (e.g., "monitoring_rule") for later reference. For the predicate 504, the user interface supports the insertion of a function (e.g., "search_time_range>=10 d runtime>10 m") into the text box 516. As shown, the predicate evaluates to a Boolean and applies the monitoring rule when the search time range is greater than 10 days (d) and the runtime is greater than 10 minutes. Thus, if a query is submitted that has an earliest time for a timestamp and a latest time for the timestamp 10 days apart and takes longer than 10 minutes to execute, the monitoring rule applies. In the example, the predicate of the monitoring rule specifies how the monitoring is performed. In at least some embodiments, the monitoring is performed for each query. The actions of the monitoring rules are performed when the queries match the predicate. In another example implementation, the predicate may specify which queries to monitor and a separate function of the monitoring rule may be performed to specify how the monitoring is performed (e.g., runtime greater than 10 minutes).

Continuing with the monitoring rule 500, as indicated in the schedule 506, the user may select from various possible schedules using drop down box 518 similar to the admission control rule in FIG. 3. In the example, the user selects that the monitoring rule 500 is always on. In the action 508 section, the user may select from various possible actions using drop down box 520. As shown in the drop down box, the action may be to place the search in a pool identified in the workload pool identifier, move the search to an alternative pool, abort the search, or display a message. In the example, the user selects that matching queries are placed in an alternate pool. The pool identifier 510 section and the user message section 512 are the same as described above with reference to FIG. 4, to allow the user to select a workload pool identifier of the alternative pool to place the search and to allow the user to submit a user defined message, respectively.

Once the various workload rules are defined, the various workload rules may be saved and applied to new queries according to the schedules specified in the workload rule. FIGS. 6-10 are flowcharts illustrating example processes for workload pool management for search time range. The various blocks of FIGS. 6-10 may be performed using the components described in FIGS. 1-5 and 11-16. The example processes of FIGS. 6-10 can be implemented, for example, by a computing device that comprises a processor and a non-transitory computer-readable medium. The non-transitory computer readable medium can be storing instructions that, when executed by the processor, can cause the processor to perform the operations of the illustrated processes of FIGS. 6-10. Alternatively or additionally, the processes of FIGS. 6-10 can be implemented using a non-transitory computer-readable medium storing instructions that, when executed by one or more processors, cause the one or more processors to perform the operations of the processes of FIGS. 6-10.

Figure 6:
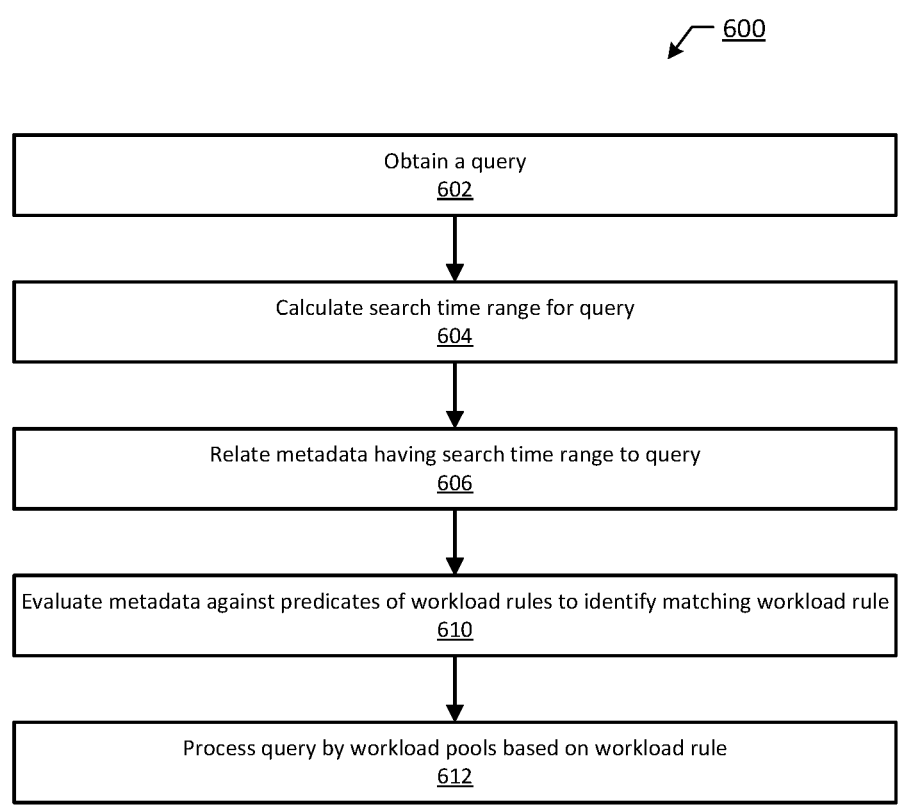
FIG. 6 is a flow diagram for processing a query for workload rules that include search time criteria in accordance with disclosed embodiments.

FIG. 6 is a flow diagram for processing a query for workload rules that include search time criteria 600 in accordance with disclosed embodiments. In Block 602, a query is obtained. The query may be an ad hoc query that is obtained from the user interface of the data intake and query system. In such an example, the query may be obtained by the ad hoc query handler. As another example, the query may be a saved query. The saved query may be received from the scheduler that triggers the execution of the query at a predefined time period.

In Block 604, the search time range for the query is calculated. Without executing the query, the time range of the timestamps of events that would satisfy the query is calculated. For example, the latest time and the earliest time may be identified from the query. The difference between the latest time and the earliest time may be calculated as the search time range. If the query does not specify a latest or earliest time, a default time may be used. For example, if the query does not specify a latest time, the current time may be used as the latest time. If the query does not specify any time, the time may be determined based on default. For example, the default may be all time (i.e., all events could match regardless of timestamps) or a preset default time (e.g., last 24 hours). The default time may be dependent on the type of data being searched.

In Block 606, metadata having the search time range is related to the query. The metadata that is associated with the query may include a user identifier and/or user role of the user that submitted the query, the time that the query is submitted, and the search time range. Other metadata may be related to the query without departing from the scope of the technology.

In Block 610, the metadata is evaluated against the predicates of the workload rules to identify a matching workload rule. The evaluation may be performed as follows. For each workload rule which is enabled based on the schedule in the workload rule, the predicate is executed using the metadata as the input to the predicates. The predicate using the metadata may evaluate to true or to false. If the predicate evaluates to true using the metadata, the workload rule is deemed a matching workload rule and is applied to the query. If the predicate evaluates to false using the metadata, the workload rule is not matching and therefore not applied. In one or more embodiments, the workload rules are executed in order according to types. For example, the initial workload rule that is executed may be the admission control rules, then the pool selection rules, and then the monitoring rules. If the predicate of the respective rule evaluates to true, the action of the respective rule is performed. In some cases, the action causes further evaluation of the predicates of the workload rules to halt.

In Block 612, the query is processed by the workload pools based on the workload rule. For the admission control rules, processing the query based on the matching workload rule may be to halt execution of the query and output the output message in the matching workload rule. The admission control rules may thereby cause the query to abort execution. For the pool selection rules, processing the query based on the matching workload rule may be to assign the query to a workload pool identified in the workload rule by the workload pool identifier. The hardware resources allocated to the assigned workload pool executes the query. Executing the query is described below with reference to FIGS. 13-16. For the monitoring rules, processing the query may be to monitor the execution of the query and perform any action specified, when, during execution, the execution of the query triggers the predicate of the monitoring rule. For example, periodically, the runtime of the query may be compared against the runtime specified in the monitoring rule to determine whether the predicate is satisfied. When processing of the query completes, the results or output message is saved or transmitted to the client using the corresponding handler.

FIG. 7 is a flow diagram for processing a query using an admission control rule and a pool selection rule 700 in accordance with disclosed embodiments. FIG. 7 is a more detailed version of FIG. 6. However, FIG. 6 is not limited to the technique described in FIG. 7. Further, one or more blocks of FIG. 7 may replace or be replaced by one or more blocks of FIG. 6.

In Block 702, a new query is obtained. The new query may be obtained as described above with reference to Block 602 of FIG. 6. In Block 704, the query is parsed to create an abstract syntax tree for the query. Parsing the query separates out the query into component parts for evaluation. The abstract syntax tree is a tree representation of the abstract syntactic structure of the query. Each node corresponds to a construct in the query. Some of the nodes of the abstract syntax tree may be operation nodes and other nodes may be data nodes. In some embodiments, optimizations may be performed while parsing the query. Other types of tree may be used without departing from the scope of the technology.

In Block 706, a search time range is calculated from the abstract syntax tree.

Calculating the search time range is performed by identifying the nodes having the latest time and the nodes having the earliest time in the abstract syntax tree. The time difference between the latest time selected in the query and the earliest time selected in the query is calculated and used as the search time range. In Block 708, metadata having the search time range is related to the query. Specifically, metadata is stored with the query in a datastore or memory when the search is dispatched. For example, the metadata may be stored in a file on disk after the search is dispatched.

The workload pool controller evaluates the admission control rules. To evaluate the admission control rules, in Block 710, the workload pool controller evaluates, using the metadata, the predicates of the admission control rules, whereby the predicates include the search time range criterion. For each admission control rule that is evaluated, the search time range criterion in the predicate is compared to the search time range calculated in Block 706. If the search time range criterion is satisfied and the other criteria is satisfied as defined by the admission control rule, then the predicate of the admission control rule is satisfied. In Block 712, a determination is made whether the predicate is satisfied.

If the predicate is satisfied, the flow proceeds to Block 714 to perform the actions specified by the admission control rule having the satisfied predicates. For example, the action may be to reject the query in Block 714. In Block 716, an output message of the admission control rule is presented. Presenting the output message may be to display the output message in storage, add the output message to a log file or error report, or perform another operation. Rather than rejecting the query, the action may be to warn the end user and ask for confirmation to proceed with the query. As another example, the action may be to request that the end user modify the query. Although not shown in FIG. 7, if the action is only to warn the user, the flow may proceed from Block 716 to Block 718 in some embodiments.

Returning to Block 712, if the predicates are not satisfied, the flow proceeds to Block 718. Specifically, the flow in FIG. 7 is for the admission control rules to be a deny set of rules for queries. If the admission control rules are an allowed set of rules (not shown), the yes and no arrows from Block 712 of FIG. 7 are swapped. Both techniques of an allow set and a deny set are included in the present application without departing from the scope of the claims.

In Block 718, the predicates of a pool selection rule including the search time range criterion is evaluated using the metadata. Evaluating the predicates of a pool selection rule may be performed in a same or similar manner to evaluating the predicates of the admission control rule. Specifically, the search time range in the metadata is compared to the search time range criterion of the predicate. If the search time range of the metadata satisfies the search time range criterion, then the predicate might be satisfied. The other criteria of the predicate are also evaluated. Additional predicates may also be similarly evaluated.

A determination is made in Block 720 whether the predicates are satisfied. If one or more of the predicates are satisfied, the flow proceeds to Block 722 to assign the query to the workload pool identified by the matching pool selection rule. Assigning the query to the workload pool associates, in memory, the query with the workload pool identifier of the workload pool identified by the pool selection rule. The data intake and query system then uses the resources to execute the query by the assigned workload pool based on the workload rule in Block 724.

Returning to Block 720, if a determination is made that the predicates are not satisfied, the flow proceeds to Block 726, whereby a determination is made whether another pool selection rule exists that is not evaluated against the metadata of the query. If another pool selection rule does exist, the flow returns to Block 718 to evaluate the one or more predicates of such pool selection rule. In one or more embodiments, the evaluation of the pool selection rules are performed in a predefined order. For example, a user may specify an order of executing workload rules. If no order is selected, the order may be the order that the workload rules were added to the data intake and query system. The earliest executed workload rule that matches a query is used. As an alternative example, the predefined order may be based on the priority level of the corresponding workload pools. Workload rules for higher priority pools may be evaluated before workload rules for lower priority rules. Alternatively, workload rules for lower priority pools may be evaluated before workload rules for higher priority rules. The action of the earliest pool selection rule having satisfied predicates is performed to assign the query. If no other pool selection rule exists, the flow proceeds to Block 728 to assign the query to the default workload pool.

After being assigned, the query is executed by the assigned workload pool based on the workload rule in Block 724. From a backend perspective, the hierarchical definition of workload pools may match the control group (i.e., Cgroup) allocation of the LINUX® kernel. LINUX® is a registered trademark owned by Linus Torvalds. CGroups are kernel level allocation of resources that is supported by a virtual filesystem. In the filesystem, containment within the folder represents a parent child relationship in a file system hierarchy. Each folder is a Cgroup. The Cgroup hierarchy may be defined by creating, removing, and renaming subdirectories within the Cgroup virtual filesystem.

The data search and query system uses resource groups to interface with users and perform application level processing to select and assign requests to corresponding resource groups. To enforce the resource allocation, the data intake and query system may use operating system processes that enforce according to Cgroups. In other words, each Cgroup has a matching workload pool. Once the workload pool is selected and assigned to the request, the data intake and query system assigns the processes used to process the request to the particular Cgroup matching the assigned workload pool.

The workload pool spans resources of the search head and of the indexers, described below. Thus, through the various stages of query execution, the portion of the resources of the search head and indexers that are allocated to the workload pool are used for execution. Within a workload pool, the resources of the workload pool are shared amongst the queries assigned to the workload pool.

During execution, the query is monitored using the monitoring rules. The predicates for the monitoring rules are evaluated using the metadata and the current runtime to determine whether the monitoring rule is satisfied. Besides reasons related to monitoring rules, other reasons may exist to move the query to a different workload pool. For example, a user may specify to move the query.

FIG. 8 illustrates a flowchart to move, while executing, a search query between workload pools in accordance with disclosed embodiments. While processing the search query, embodiments allow for the search query to be moved from one workload pool to another workload pool without interruption. Specifically, even though the search query may be performed across multiple devices, the movement of the search query may be performed across the multiple devices without interrupting execution.

At Block 802, the query is assigned to a selected workload pool. Receiving the query and assigning the query to the workload pool may be performed as discussed above with reference to FIG. 6 and FIG. 7. At Block 804, the search query is executed using a first hardware resource in the first workload pool. Executing the search query may be performed as described above with reference to FIG. 6 and FIG. 7. Specifically, the kernel resource manager allocates hardware resources assigned to the workload pool to the search query.

While executing the query, at Block 806, an update command is received to move the query to another workload pool. The update command may be received from a component of the workload manager evaluating the monitoring rules, a user, the client application, another application, or may be based on another policy or rule.

Accordingly, while executing the query, the query is moved to the second workload pool at Block 808. The search head determines whether the move is valid, identifies the processes corresponding to the query, and sends an operating system command to move the processes to the new workload pool. The search head also sends a command to the indexers to move the query. The indexers identify the processes for the query and issue a move command to move the query locally on the indexers to the new workload pool. Moving the query may be performed as follows.

An update command is received to move the query. In one or more embodiments, a request handler on the search head receives the request. A determination is made whether the query is in the dispatch cache. The dispatch cache maintains the set of search queries that have been dispatched and are being executed. Thus, if a determination is made that the query is not in the dispatch cache, then the move is not performed and the process ends. If the query is in the dispatch cache, a determination is made whether a mapping is found. Specifically, a determination is made whether the query maps to a process runner. One of the processes spawned in response to receiving the query is a process runner that manages execution of the query across the indexers. Accordingly, a determination is made whether a mapping between the query and the process runner process is found. If a mapping does not exist, the flow proceeds to end. If a mapping is found, the request handler of the search head issues a call to the process runner. The call is a command to move the query to the new workload pool. The process runner for the query processes the request.

The process runner processes the request to move the query between workload pools as follows. On the process runner side, the process runner receives a call to move the query. A determination is made by the process runner whether the command can be decoded. If the command cannot be decoded, then the flow proceeds to end. If the command can be decoded, a determination is made whether one or more process identifiers for the query are found. Specifically, the process runner searches a table to identify the processes related to processing the query. If process identifiers cannot be found, then the flow proceeds to end. If the processes can be found, the processes are moved to the new workload pool. For example, an operating system call may be performed to request that the set of processes identified above are moved. The search process is signaled and informs its own process runner to move its set of child processes to the new workload pool. In one or more embodiments, forked grandchildren may be unaffected, but processes forked from this point onward will be assigned the new workload pool. For custom commands, the responsibility of tracking and moving its children is with the parent external command process in one or more embodiments. If the underlying operating system support structure is a Cgroup, then the processes are moved by issuing a call requesting that the processes be moved to the new Cgroup.

To perform the move, in general, the controllers (e.g., CPU controller, memory controller, I/O controller, etc.) move the processes under those controller paths to the new workload pool. The processes may be moved, terminated, or paused. The operating system may perform different actions for different controllers. For the CPU, the operating system changes the share of the CPU according to the new workload pool. For memory, the operating system tracks used memory, and may terminate processes or swapping. The operating system may perform other actions for other controllers.

Continuing with FIG. 8, at Block 812, execution of the search query continues using a second hardware resource in the second workload pool. After the search query is moved, during the next time period in which the processes of the search query is executed, the kernel resource manager schedules execution using the second hardware resource that is allocated to the second workload pool. The first hardware resource is no longer used to process the search query unless the first hardware resource is an excess resource of the first workload pool.

Figure 9:
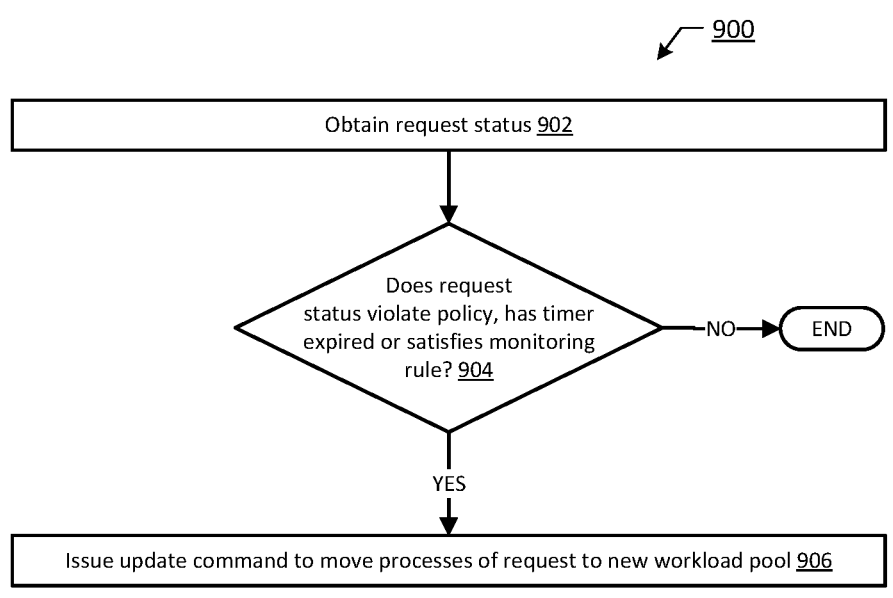
FIG. 9 is a flow diagram for monitoring the execution of a query in accordance with disclosed embodiments.

FIG. 9 is a flow diagram for monitoring the execution of a query in accordance with disclosed embodiments. At Block 902, a request status is obtained. The workload manager obtains the status of executing the query. The status includes the current runtime of executing the query. In one or more embodiments, the runtime is the difference between the current time and the time at which the query is assigned to the workload pool. In some embodiments, the runtime excludes the time that the wait cycles of executing the query, such as due to waiting for other queries to execute. In such embodiments, the runtime may only include the number of cycles in which the query is actively executing.

In Block 904, a determination is made whether the request status violates a policy, has a timer expired, or satisfies monitoring rule. For example, the policies to move a search query may be based on one or more of time, user, role, application, quota of search queries, etc. The timer may be based on the total length of time that the query is assigned to the workload pool in order to prevent starvation of the query. Determining whether the query satisfies the monitoring rule includes evaluating the predicate of the monitoring rule. For example, the predicate may be evaluated using the metadata and the runtime in the request status. If the runtime satisfies the runtime criteria in the monitoring rule and the other criteria of the predicate are satisfied, the monitoring rule is satisfied.

If the request status does not violate a policy or if a timer has not expired, the flow proceeds to end. If the request status violates a policy, if the timer has expired for the request, or if a predicate of the monitoring rule is satisfied, an update command is issued to move the processes of the request to the new workload pool. The monitoring rule may identify the target workload pool to move the query. In such a scenario, the query is moved to the identified workload pool. In another example, the update command is to move the query to a different workload rule.

Figure 10:
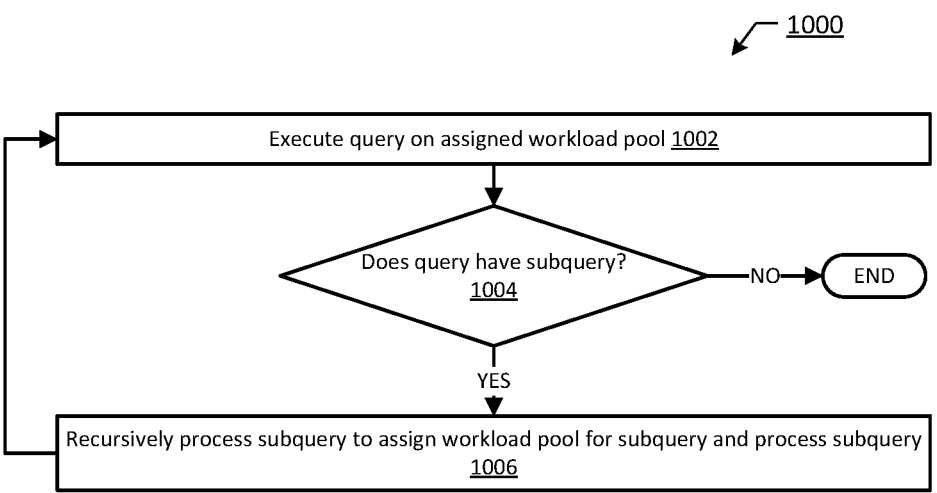
FIG. 10 is a flow diagram for executing a query having subqueries in accordance with disclosed embodiments.

FIG. 10 is a flow diagram for executing a query having subqueries in accordance with disclosed embodiments. A subquery is a portion of the query that may execute prior to the main query. For example, the subquery may use an initial set of data for processing. In some cases, the subquery may have different execution times than the main query. In some embodiments, a query having subqueries is assigned to the same workload pool as the subquery. In other embodiments, a separate assignment is performed for the subquery.

FIG. 10 shows processing subqueries in a different workload pool. In Block 1002, the query is executed on the assigned workload pool. During execution, a determination is made whether the query has a subquery in Block 1004. If the query does not have a subquery, the flow proceeds to end. If the query has a subquery, the subquery is recursively processed to assign a workload pool for the subquery and process the subquery. For example, the pool selection rules may be evaluated using the subquery to assign the subquery to a workload pool. Then, the subquery is executed on the workload pool. When execution completes, the flow returns to the original workload pool.

In one or more embodiments, the workload pool has the hardware resources, but executing the subquery is at the process level. To manage the assignment of subqueries, the query may be moved to the workload pool of the subquery as described above using the operations of FIG. 8 and then moved back when the execution of the subquery completes. The managing of transmitting the update command may be performed in the workload manager.

Figure 11:
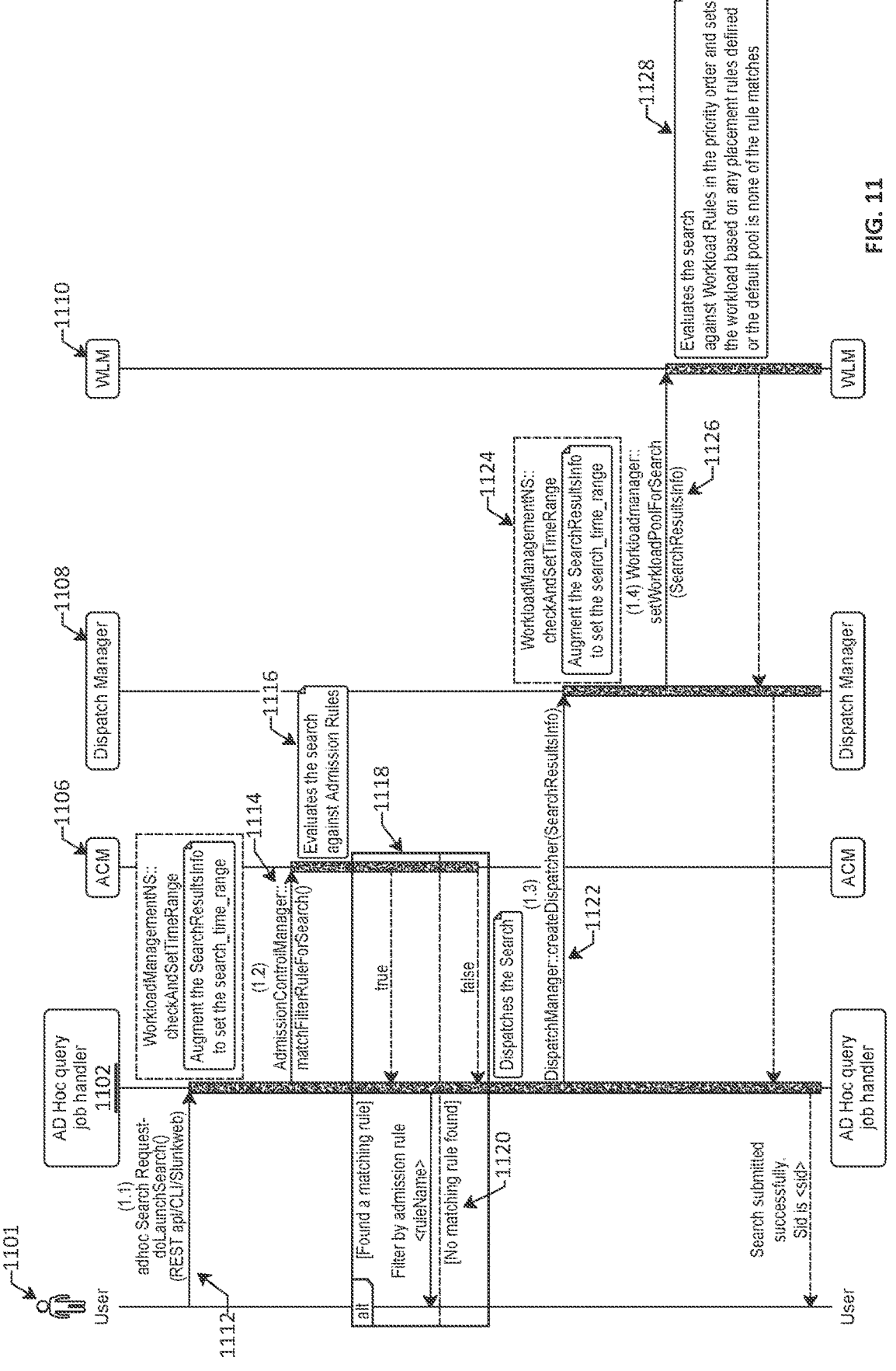
FIG. 11 is a timing diagram for executing ad hoc queries in accordance with disclosed embodiments.

FIG. 11 is a timing diagram for executing ad hoc queries in accordance with disclosed embodiments. The search request 1112 having the query is received by the ad hoc query job handler 1102 from the user 1101. The search request is received using a REST request. The ad hoc query job handler 1102 calculates the search time range and augments the query with the search time range. The ad hoc query job handler 1102 sends a request 1114 to the admission control manager 1108. The admission control manager 1108 evaluates 1116 the query against admission control rules and responds 1118 with true or false based on the predicate. If the admission control manager 1106 returns true, then the output message is sent 1120. If the admission control manager 1106 returns false, the ad hoc query job handler 1102 sends the query 1122 to the dispatch manager 1108, which augments the query with the search time range 1124 and sends the query 1126 to the workload manager 1110. The workload manager 1110 evaluates the query against the workload rules 1128. The workload manager 1110 assigns the query to a workload pool and responds to the dispatch manager with the assignment. The dispatch manager dispatches the query to the search head members for execution using the assigned workload pool and replies to the user with the search identifier of the query. Periodically, the workload manager may monitor the execution by comparing the runtime and other parameters of the query to the workload rules to determine whether to perform the action in the corresponding workload rule.manages the execution of the query. Specifically, when workload management is enabled, a workload monitoring thread is executed. The workload monitoring thread works asynchronously. The workload monitoring thread wakes up periodically and evaluates the running searches or queries against the monitoring rules and, on a match, the workload monitoring thread performs the specified action on the running searches. The results are then returned to the user.

Figure 12:
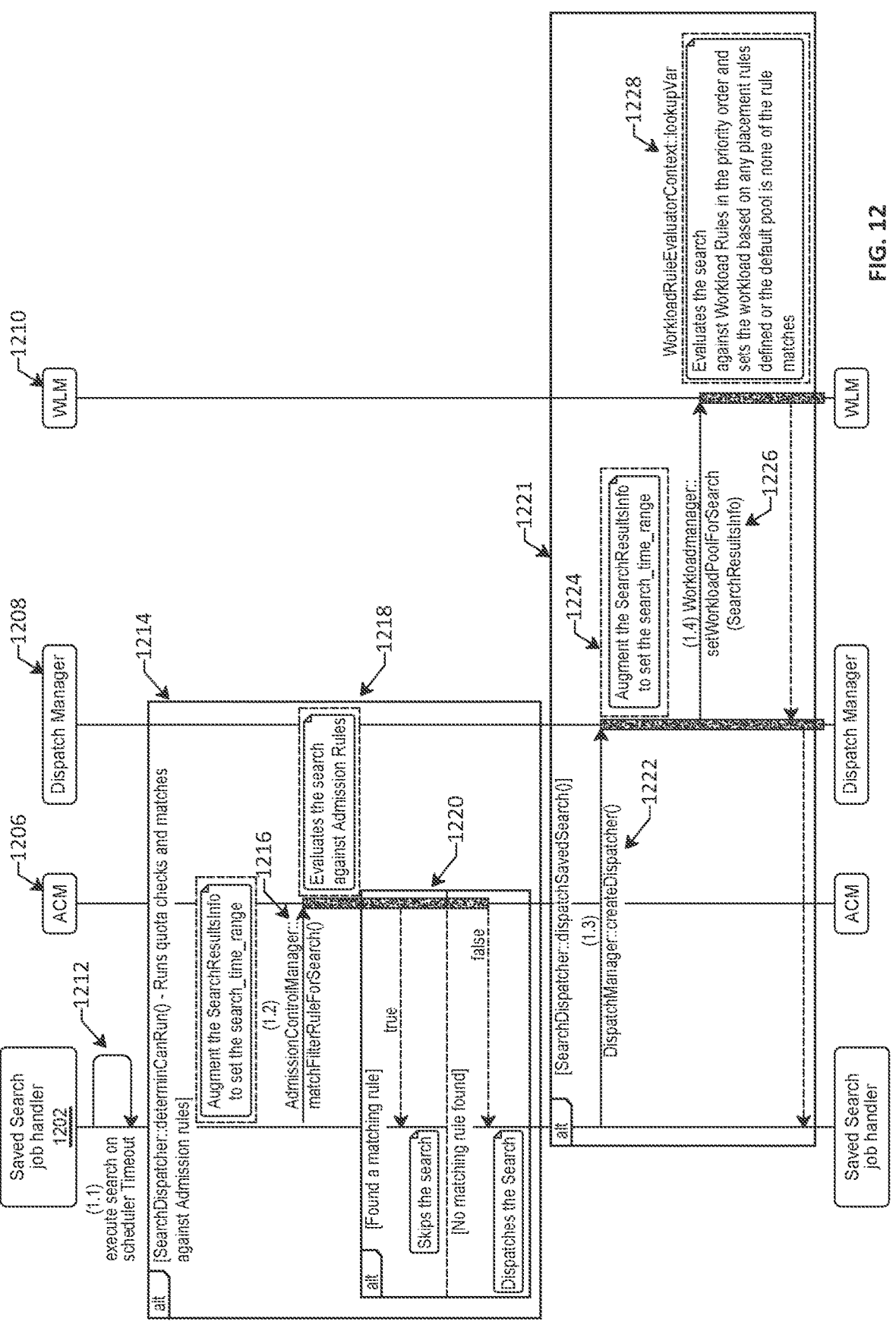
FIG. 12 is a timing diagram for executing a saved query in accordance with disclosed embodiments.

FIG. 12 is a timing diagram for executing a saved query in accordance with disclosed embodiments. A search having a query is executed 1212 according to a scheduled time by the saved search job handler 1202. At the scheduled time, the saved search job handler 1202 determines whether to process the query 1214. Specifically, the saved search job handler 1202 calculates the search time range and augments the query with the search time range. The saved search job handler 1202 sends a request 1216 to the admission control manager 1208. The admission control manager 1208 evaluates 1218 the query against admission control rules and responds 1220 with true or false based on the predicate. If the admission control manager 1206 returns true, then the search is skipped. If the admission control manager 1206 returns false, the saved search job handler 1202 dispatches the query 1221. Specifically, the admission control manager sends the query 1222 to the dispatch manager 1208, which augments the query with the search time range 1224 and sends the query 1226 to the workload manager 1210. The workload manager 1210 evaluates the query against the workload rules 1228. The workload manager 1210 assigns the query to a workload pool. The workload manager 1110 assigns the query to a workload pool and responds to the dispatch manager with the assignment. The dispatch manager dispatches the query to the search head members for execution using the assigned workload pool The execution may be monitored as described above. The results are then saved or used for further analysis.

By supporting workload pool management based on search time range, one or more embodiments provide a technique for a priori estimation of the length of time to execute the query. Events being grouped by timestamp allows for some degree of determining a length of time to execute a query. Using that knowledge, workload rules may be assigned and enforced that provide for early estimation of execution time.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
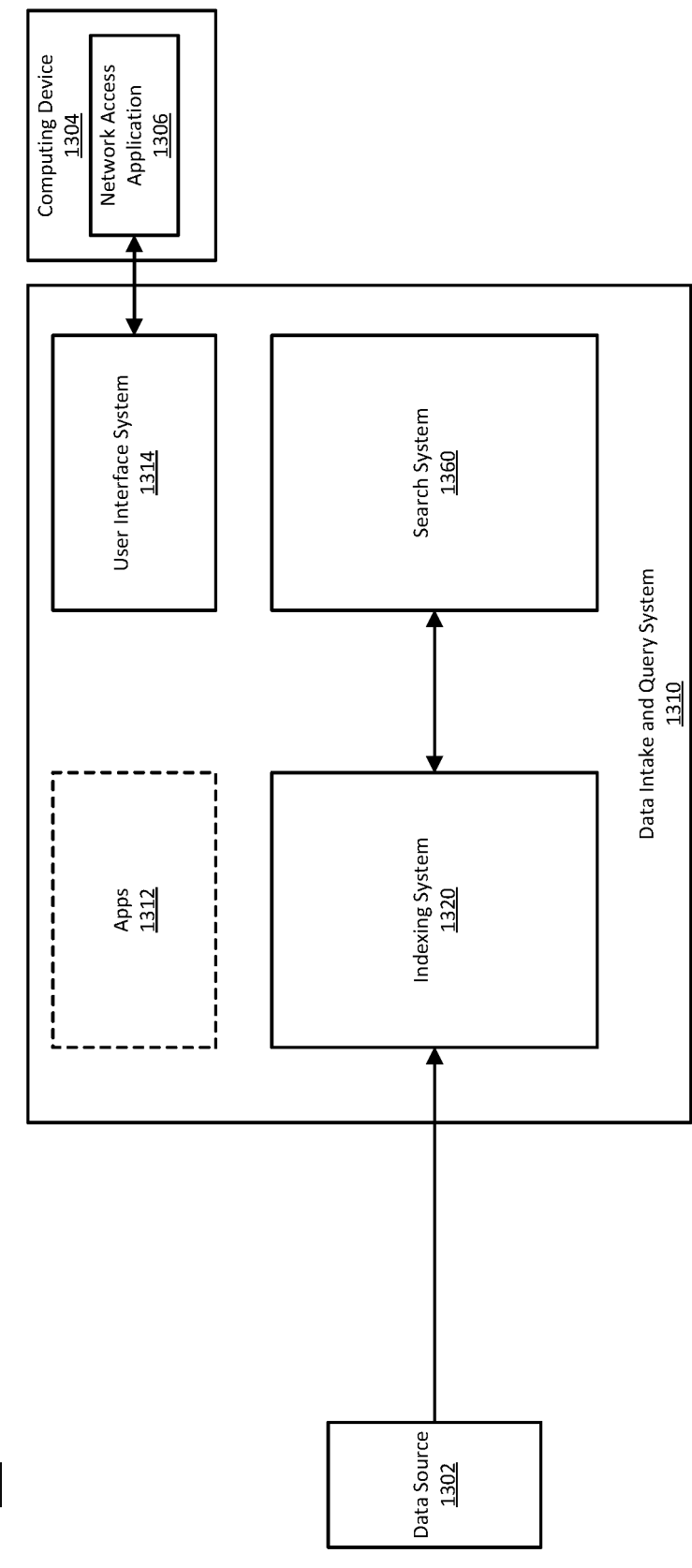
FIG. 13 illustrates an example schematic diagram of data ingest with in an indexing system in the data intake and query system in which FIG. 1 may be implemented.

FIG. 13 is a block diagram illustrating an example computing environment 1300 that includes a data intake and query system 1310. The data intake and query system 1310 obtains data from a data source 1302 in the computing environment 1300, and ingests the data using an indexing system 1320. A search system 1360 of the data intake and query system 1310 enables users to navigate the indexed data. Though drawn with separate boxes in FIG. 13, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," (user-defined entities for enriching data, such as saved searches, event types, tags, field extractions, lookups, reports, alerts, data models, workload actions, and fields), initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1310 can be executed on a single computing device, or execution of the program code can be distributed over multiple computing devices. For example, the program code can include instructions for both indexing and search components (which may be part of the indexing system 1320 and/or the search system 1360, respectively), which can be executed on a computing device that also provides the data source 1302. As another example, the program code can be executed on one computing device, where execution of the program code provides both indexing and search components, while another copy of the program code executes on a second computing device that provides the data source 1302. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine date from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing 1320 system. As discussed in greater detail below, the search system 1360 enables users associated with the computing environment 1300 (and possibly also other users) to navigate the data, generate reports, and visualize search results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries that are to be processed by the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, such as a web browser, which can use a network interface of the client computing device 1304 to communicate, over a network, with the user interface system 1314 of the data intake and query system 1310. The user interface system 1314 can use the network access application 1306 to generate user interfaces that enable a user to interact with the data intake and query system 1310. A web browser is one example of a network access application. A shell tool can also be used as a network access application. In some examples, the data intake and query system 1310 is an application executing on the computing device 1304. In such examples, the network access application 1306 can access the user interface system 1314 without going over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
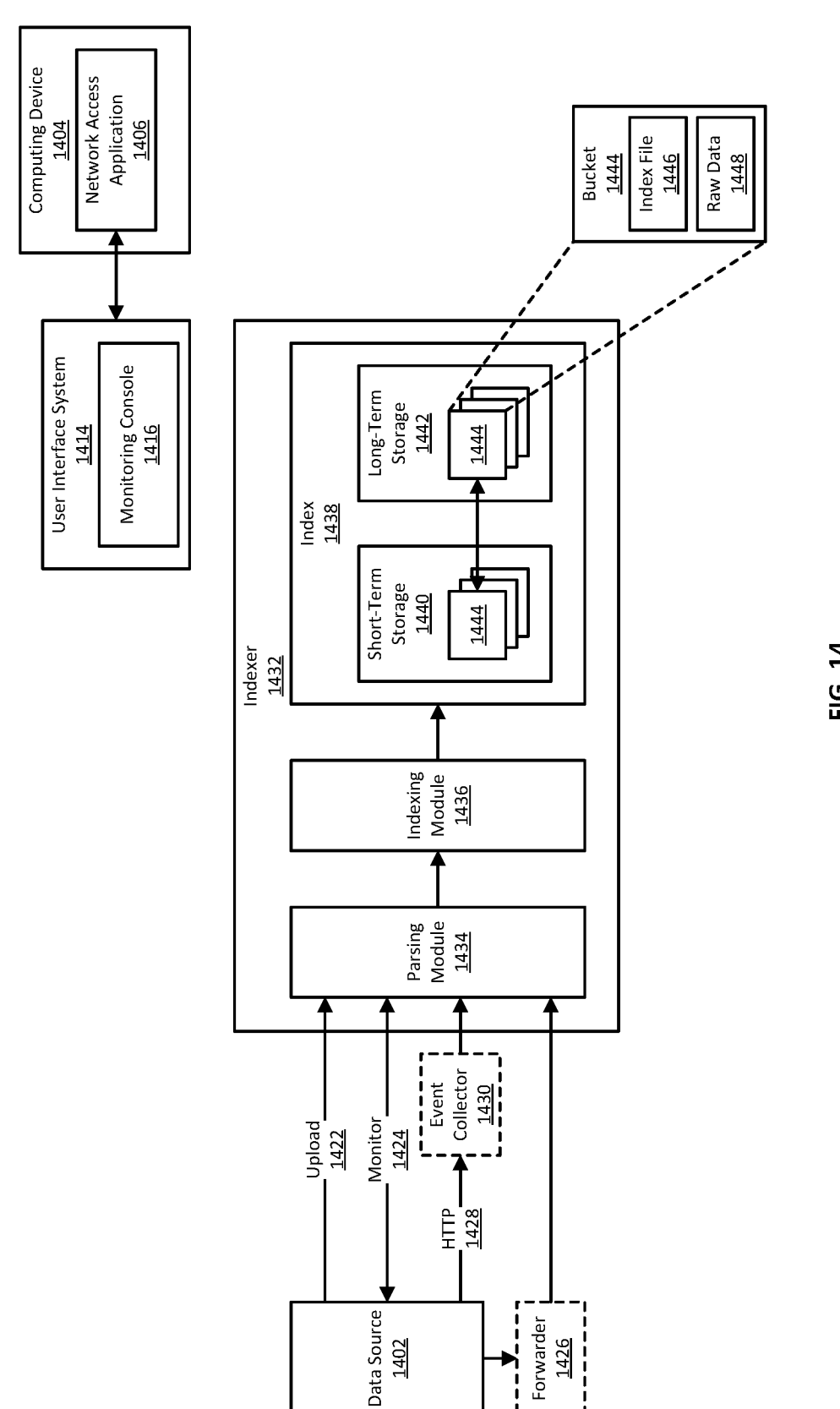
FIG. 14 illustrates an example schematic diagram of search in the data intake and query system in which FIG. 1 may be implemented.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for data ingestion; configuring the indexer 1432 to index the data from the data source 1432; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device than the illustrated computing device 1404.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can specify a file for uploading into the indexer 1432. For example, the monitoring console 1416 can include commands or an interface through which the user can specify where the file is located (e.g., on which computing device and/or in which directory of a file system) and the name of the file. The file may be located at the data source 1402 or maybe on the computing device where the indexer 1432 is executing. Once uploading is initiated, the indexer 1432 processes the file, as discussed further below. Uploading is a manual process and occurs when instigated by a user. For automated data ingestion, the other ingestion methods are used.

The monitor 1424 method enables the indexing system 1402 to monitor the data source 1402 and continuously or periodically obtain data produced by the data source 1402 for ingestion by the indexer 1432. For example, using the monitoring console 1416, a user can specify a file or directory for monitoring. In this example, the indexing system 1402 can execute a monitoring process that detects whenever the file or directory is modified and causes the file or directory contents to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the forwarder 1426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data before sending the data to the indexer 1432. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and .NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1430 extracts events from HTTP 1428 requests and sends the events to the indexer 1432. The event collector 1430 can further be configured to send events to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated in FIG. 14 to facilitate discussion, with the understanding that implementations with other components are possible to achieve the same functionality.

The parsing module 1434 determines information about incoming event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field in the event data or using machine learning techniques applied to the event data.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can exteract a set of fields (key-value pairs) for each event, such as a host or hostname, source or source name, and/or source type. The parsing module 1434 may extract certain fields by default or based on a user configuration. Alternatively or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing component 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can manage more than one index and can manage indexes of different types. For example, the indexer 1432 can manage event indexes, which impose minimal structure on stored data and can accommodate any type of data. As another example, the indexer 1432 can manage metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing component 1434 may add fields to event data and/or perform transformations on fields in the event data. Event data that has been altered in this way is referred to herein as enriched data. A raw data file 1448 can include enriched data, in addition to or instead of raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may be moves from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the index 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
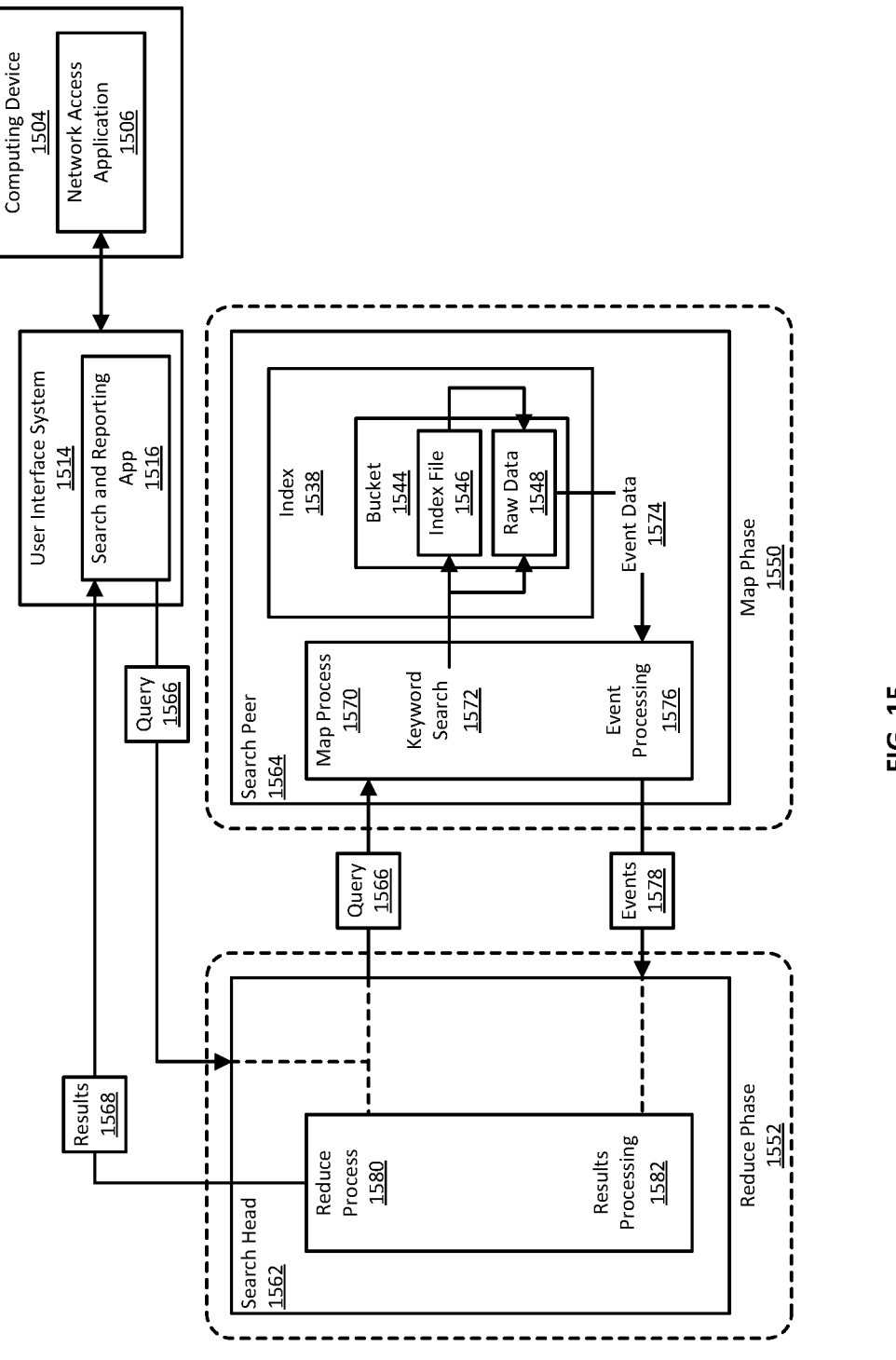
FIG. 15 illustrates an example diagram of an on premises data intake and query system in which FIG. 1 may be implemented.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands or search terms that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data and are implanted using different hardware resources q. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search 1574 using search terms specified in the search query 1566. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches a search term in the query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data #A74 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the received events. The results processing 1582 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

The reduce process 1580 outputs the events found by the search query 1566, as well as information about the events. The search head 1562 transmits the events and the information about the events as search results 1568, which are received by the search and reporting app 1516. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Chloropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively or additionally, the search and reporting app 1516 can include functionality that enables a user to configure custom dashboards.

The search and reporting app 1516 can also enable further investigation into the events in the search results 1516. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
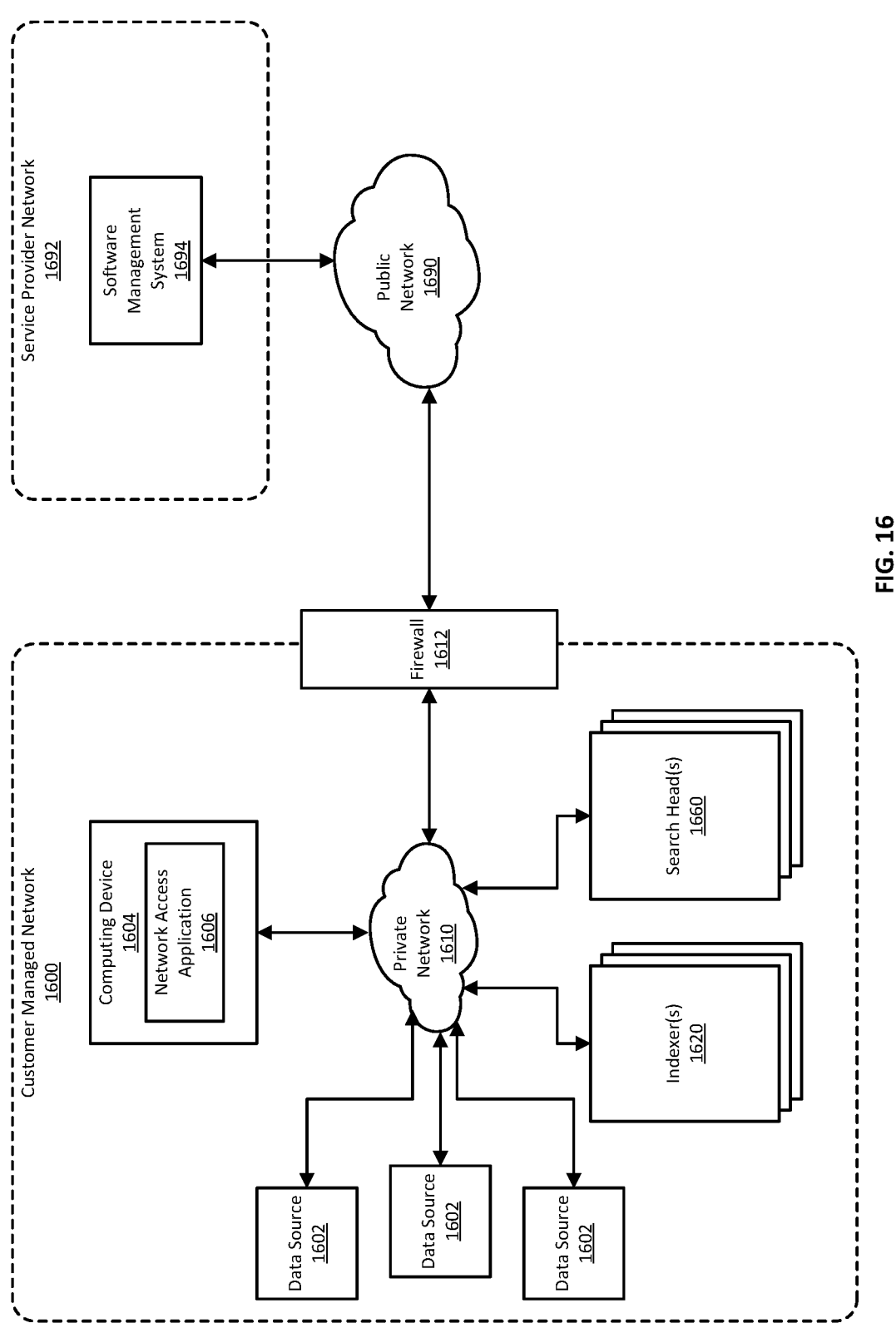
FIG. 16 illustrates an example diagram of a self-managed network that includes a data intake and query system in which FIG. 1 may be implemented.

FIG. 16 illustrates an example of a self-managed network 1600 that includes a data intake and query system. "Self-managed" in this instance means that the entity that is operating the self-managed network 1600 configures, administers, maintains, and/or operates the data intake and query system using its own compute resources and people. Further, the self-managed network 1600 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1600 is located within the customer's on-prem environment, such as in the entity's data center, the operation and management of the self-managed network 1600, including of the resources in the self-managed network 1600, is under the control of the entity. For example, administrative personnel of the entity have complete access to and control over the configuration, management, and security of the self-managed network 1600 and its resources.

The self-managed network 1600 can execute one or more instances of the data intake and query system. An instance of the data intake and query system may be executed by one or more computing devices that are part of the self-managed network 1600. A data intake and query system instance can comprise an indexing system and a search system, where the indexing system includes one or more indexers 1620 and the search system includes one or more search heads 1660.

As depicted in FIG. 16, the self-managed network 1600 can include one or more data sources 1602. Data received from these data sources may be processed by an instance of the data intake and query system within self-managed network 1600. The data sources 1602 and the data intake and query system instance can be communicatively coupled to each other via a private network 1610.

Users associated with the entity can interact with and avail themselves of the functions performed by a data intake and query system instance using computing devices. As depicted in FIG. 16, a computing device 1604 can execute a network access application 1606 (e.g., a web browser), that can communicate with the data intake and query system instance and with data sources 1602 via the private network 1610. Using the computing device 1604, a user can perform various operations with respect to the data intake and query system, such as management and administration of the data intake and query system, generation of knowledge objects, and other functions. Results generated from processing performed by the data intake and query system instance may be communicated to the computing device 1604 and output to the user via an output system (e.g., a screen) of the computing device 1604.

The self-managed network 1600 can also be connected to other networks that are outside the entity's on-premise environment/network, such as networks outside the entity's data center. Connectivity to these other external networks is controlled and regulated through one or more layers of security provided by the self-managed network 1600. One or more of these security layers can be implemented using firewalls 1612. The firewalls 1612 form a layer of security around the self-managed network 1600 and regulate the transmission of traffic from the self-managed network 1600 to the other networks and from these other networks to the self-managed network 1600.

Networks external to the self-managed network can include various types of networks including public networks 1690, other private networks, and/or cloud networks provided by one or more cloud service providers. An example of a public network 1690 is the Internet. In the example depicted in FIG. 16, the self-managed network 1600 is connected to a service provider network 1692 provided by a cloud service provider via the public network 1690.

In some implementations, resources provided by a cloud service provider may be used to facilitate the configuration and management of resources within the self-managed network 1600. For example, configuration and management of a data intake and query system instance in the self-managed network 1600 may be facilitated by a software management system 1694 operating in the service provider network 1692. There are various ways in which the software management system 1694 can facilitate the configuration and management of a data intake and query system instance within the self-managed network 1600. As one example, the software management system 1694 may facilitate the download of software including software updates for the data intake and query system. In this example, the software management system 1694 may store information indicative of the versions of the various data intake and query system instances present in the self-managed network 1600. When a software patch or upgrade is available for an instance, the software management system 1694 may inform the self-managed network 1600 of the patch or upgrade. This can be done via messages communicated from the software management system 1694 to the self-managed network 1600.

The software management system 1694 may also provide simplified ways for the patches and/or upgrades to be downloaded and applied to the self-managed network 1600. For example, a message communicated from the software management system 1694 to the self-managed network 1600 regarding a software upgrade may include a Uniform Resource Identifier (URI) that can be used by a system administrator of the self-managed network 1600 to download the upgrade to the self-managed network 1600. In this manner, management resources provided by a cloud service provider using the service provider network 1692 and which are located outside the self-managed network 1600 can be used to facilitate the configuration and management of one or more resources within the entity's on-prem environment. In some implementations, the download of the upgrades and patches may be automated, whereby the software management system 1694 is authorized to, upon determining that a patch is applicable to a data intake and query system instance inside the self-managed network 1600, automatically communicate the upgrade or patch to self-managed network 1600 and cause it to be installed within self-managed network 1600.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
receiving and parsing a query for an event into an abstract syntax tree;
calculating a search time range for the parsed query, the search time range being a difference as measured in time between an earliest timestamp and a latest timestamp of matching events that match the event of the query;
relating metadata having the search time range to the query;
comparing a plurality of predicates in a plurality of workload rules to the metadata for the query to identify one or more matching workload rules, wherein the plurality of predicates comprises a predicate associated with the one or more matching workload rules, the predicate specifying a minimum time difference, and wherein comparing the plurality of predicates comprises determining that the difference is greater than the minimum time difference; and
processing the query by executing the one or more matching workload rules, wherein the one or more matching workload rules include a plurality of workload pools, and wherein an order of executing the one or more matching workload rules is based on a type of workload rule including at least an admission control rule before a pool selection rule, wherein processing the query comprises:
executing the query by a hardware resource allocated to a first workload pool identified by a pool selection rule,
determining, while executing the query, that the query comprises a subquery, and
recursively processing the subquery, wherein recursively processing the subquery comprises:
comparing the subquery to the plurality of predicates to identify a second workload pool for the subquery,
executing the subquery on the second workload pool, wherein the second workload pool is different from the first workload pool, and
after executing the subquery on the second workload pool, continuing executing the query on the first workload pool.

2. The computer-implemented method of claim 1, further comprising:
determining that the query matches an admission control rule;
halting execution of the query responsive to the query matching the admission control rule;

outputting an output message based on the query matching the admission control rule; and
receiving a modified query responsive to the output message,
wherein processing the query comprises processing the modified query.

3. The computer-implemented method of claim 1, wherein comparing the plurality of predicates comprises:
determining that the metadata does not match a first subset of the plurality of predicates in a plurality of admission control rules of the plurality of workload rules;
comparing the metadata to a second subset of the plurality of predicates in a plurality of pool selection rules of the plurality of workload rules to identify the one or more matching workload rules; and
assigning the query to the first workload pool identified by the one or more matching workload rules.

4. The computer-implemented method of claim 1, further comprising:
determining that the metadata matches a monitoring rule,
wherein processing the query further comprises:
monitoring, while executing the query, the execution of the query to obtain a runtime,
determining that the runtime matches a runtime criterion in the monitoring rule,
moving, while executing the query, the query to a third workload pool based on the runtime matching the runtime criterion, and
continuing executing the query on the third workload pool.

5. The computer-implemented method of claim 1, further comprising:
displaying a user interface for editing a workload pool rule; and
receiving, in the user interface:
the predicate of the plurality of predicates,
a schedule for when the workload pool rule is applicable,
an action to perform responsive to a matching of the predicate, and
an output message.

6. The computer-implemented method of claim 1, wherein the metadata includes at least one of a user identifier of a user that submitted the query, a user role of the user that submitted the query, a time the query was submitted, the search time range.

7. A computing device, comprising:
a processor; and
a non-transitory computer-readable medium having stored thereon instructions that, when executed by the processor, cause the processor to perform operations including:
receiving and parsing a query for an event into an abstract syntax tree;
calculating a search time range for the parsed query, the search time range being a difference as measured in time between an earliest timestamp and a latest timestamp of matching events that match the event of the query;
relating metadata having the search time range to the query;
comparing a plurality of predicates in a plurality of workload rules to the metadata for the query to identify one or more matching workload rules, wherein the plurality of predicates comprises a predicate associated with the one or more matching workload rules, the predicate specifying a minimum time difference, and wherein comparing the plurality of predicates comprises determining that the difference is greater than the minimum time difference; and processing the query by executing the one or more matching workload rules, wherein the one or more matching workload rules include a plurality of workload pools, and wherein an order of executing the one or more matching workload rules is based on a type of workload rule including at least an admission control rule before a pool selection rule, wherein processing the query comprises:

executing the query by a hardware resource allocated to a first workload pool identified by a pool selection rule, determining, while executing the query, that the query comprises a subquery, and recursively processing the subquery, wherein recursively processing the subquery comprises:

comparing the subquery to the plurality of predicates to identify a second workload pool for the subquery, executing the subquery on the second workload pool, wherein the second workload pool is different from the first workload pool, and after executing the subquery on the second workload pool, continuing executing the query on the first workload pool.

8. The computing device of claim 7, wherein the operations further include:

determining that the query matches an admission control rule;

halting execution of the query responsive to the query matching the admission control rule;

outputting an output message based on the query matching the admission control rule; and receiving a modified query responsive to the output message, wherein processing the query comprises processing the modified query.

9. The computing device of claim 7, wherein comparing the plurality of predicates comprises:

determining that the metadata does not match a first subset of the plurality of predicates in a plurality of admission control rules of the plurality of workload rules;

comparing the metadata to a second subset of the plurality of predicates in a plurality of pool selection rules of the plurality of workload rules to identify the one or more matching workload rules; and assigning the query to the first workload pool identified by the one or more matching workload rules.

10. The computing device of claim 7, wherein the operations further comprise:

determining that the metadata matches a monitoring rule, wherein processing the query further comprises:

monitoring, while executing the query, the execution of the query to obtain a runtime, determining that the runtime matches a runtime criterion in the monitoring rule, moving, while executing the query, the query to a third workload pool based on the runtime matching the runtime criterion, and continuing executing the query on the third workload pool.

11. The computing device of claim 7, wherein the operations further comprise:

--- displaying a user interface for editing a workload pool rule; and receiving, in the user interface:

the predicate of the plurality of predicates, a schedule for when the workload pool rule is applicable, an action to perform responsive to a matching of the predicate, and an output message.

12. The computing device of claim 7, wherein the metadata includes at least one of a user identifier of a user that submitted the query, a user role of the user that submitted the query, a time the query was submitted, the search time range.

13. A non-transitory computer-readable medium having stored thereon instructions that, when executed by one or more processors, cause the one or more processors to perform operations including:

receiving and parsing a query for an event into an abstract syntax tree;

calculating a search time range for the parsed query, the search time range being a difference as measured in time between an earliest timestamp and a latest timestamp of matching events that match the event of the query;

relating metadata having the search time range to the query;

comparing a plurality of predicates in a plurality of workload rules to the metadata for the query to identify one or more matching workload rules, wherein the plurality of predicates comprises a predicate associated with the one or more matching workload rules, the predicate specifying a minimum time difference, and wherein comparing the plurality of predicates comprises determining that the difference is greater than the minimum time difference; and processing the query by executing the one or more matching workload rules, wherein the one or more matching workload rules include a plurality of workload pools, and wherein an order of executing the one or more matching workload rules is based on a type of workload rule including at least an admission control rule before a pool selection rule, wherein processing the query comprises:

executing the query by a hardware resource allocated to a first workload pool identified by a pool selection rule, determining, while executing the query, that the query comprises a subquery, and recursively processing the subquery, wherein recursively processing the subquery comprises:

comparing the subquery to the plurality of predicates to identify a second workload pool for the subquery, executing the subquery on the second workload pool, wherein the second workload pool is different from the first workload pool, and after executing the subquery on the second workload pool, continuing executing the query on the first workload pool.

14. The non-transitory computer-readable medium of claim 13, wherein the operations further include:

determining that the query matches an admission control rule;

halting execution of the query responsive to the query matching the admission control rule;

outputting an output message based on the query matching the admission control rule; and receiving a modified query responsive to the output message, wherein processing the query comprises processing the modified query.

15. The non-transitory computer-readable medium of claim 13, wherein the metadata includes at least one of a user identifier of a user that submitted the query, a user role of the user that submitted the query, a time the query was submitted, the search time range.

\* \* \* \* \*